United States Patent [19]

Uemura et al.

[11] Patent Number: 4,912,310

[45] Date of Patent: Mar. 27, 1990

[54] METHOD OF AND SYSTEM FOR ISSUING CARDS

[76] Inventors: Yoshitaka Uemura; Hiroyuki Ito; Katsuhiro Tsuchida; Hisato Takahashi, all of c/o Patent Center, Omron Tateisi Electronics Co., 20, Igadera, Shimokaiinji, Nagaokakyo-shi, Kyoto 617, Japan

[21] Appl. No.: 157,136

[22] Filed: Feb. 10, 1988

Related U.S. Application Data

[63] Continuation of Ser. No. 919,566, Oct. 20, 1986, abandoned, which is a continuation of Ser. No. 711,416, Mar. 13, 1985, abandoned.

[30] Foreign Application Priority Data

| | | | |
|---|---|---|---|
| Nov. 5, 1984 | [JP] | Japan | 59-233491 |
| Nov. 5, 1984 | [JP] | Japan | 59-233492 |
| Nov. 5, 1984 | [JP] | Japan | 59-233493 |
| Nov. 5, 1984 | [JP] | Japan | 59-233494 |

[51] Int. Cl.$^4$ .......... G06F 15/30

[52] U.S. Cl. .......... 235/380; 235/379; 235/382

[58] Field of Search .......... 235/380, 382, 382.5

[56] References Cited

U.S. PATENT DOCUMENTS

| | | | |
|---|---|---|---|
| 3,857,018 | 12/1974 | Stark | 235/382 |
| 4,209,782 | 6/1980 | Donath | 235/382.5 |
| 4,213,118 | 7/1980 | Genest et al. | |
| 4,283,710 | 8/1981 | Genest et al. | |
| 4,385,231 | 5/1983 | Mizutowi | 235/382 |
| 4,415,893 | 11/1983 | Roland | 235/382 |
| 4,439,670 | 3/1984 | Basset | 235/382.5 |
| 4,558,175 | 12/1985 | Genest | 235/382.5 |
| 4,594,636 | 6/1986 | Nagata | 235/380 |

FOREIGN PATENT DOCUMENTS

| | | |
|---|---|---|
| 2370308 | 6/1978 | France . |
| 2118614 | 11/1983 | United Kingdom . |

*Primary Examiner*—Harold I. Pitts

*Attorney, Agent, or Firm*—Wegner & Bretschneider

[57] ABSTRACT

A method of issuing cards by using a card issuing machine including a memory having stored therein an initial secret code, a card reader and a keyboard. Checking whether a secret code keyed in matches the initial secret code stored in the memory; storing in a memory a code keyed in for associating a first card with the card issuing machine and recording the associating keyed-in code in the first card by the card reader to issue the first card when the two secret codes are found to match; issuing a new card upon confirming a keyed-in first secret code of the first card; and issuing another new card upon confirming a secret code on the new card issued.

38 Claims, 32 Drawing Sheets

FIG.3

| | | | | | | | | |
|---|---|---|---|---|---|---|---|---|
| GRAND AUTHORIZATION CARD (GR) | FORMALITY CODE STX,ETX,LRC | HOTEL CODE | CLASSIFICATION CODE | — | — | — | — | — |
| MASTER AUTHORIZATION CARD (MA) | " | " | " | — | STAFF CODE | STAFF SECRET CODE | — | — |
| SUB-MASTER AUTHORIZATION CARD (SMA) | " | " | " | — | " | " | — | — |
| GUEST AUTHORIZATION CARD (GA) | " | " | " | — | " | " | — | — |
| EMERGENCY CARD | " | " | " | SEQUENCE NO. | — | — | — | SEQUENCE SUB NO. |
| MASTER CARD | " | " | " | " | — | — | — | " |
| MAID CARD | " | " | " | " | STARTING ROOM NO. | ENDING ROOM NO. | TIME ZONE | " |
| GUEST CARD A | " | " | " | " | ROOM NO. | ISSUE DAY (CHECKIN) | CHECKOUT DAY, HOUR | " |
| GUEST CARD B | " | " | " | " | " | " | " | " |
| MAINTENANCE CARD | " | " | " | " | " | ISSUE DAY | — | " |
| LOCKOUT CARD | " | " | " | " | — | — | — | " |
| CANCELLING CARD | " | " | " | " | — | — | — | " |
| STANDBY CARD | " | " | " | STANDBY SEQUENCE NO. | ROOM NO. | — | — | — |

FIG. 22a
(A)
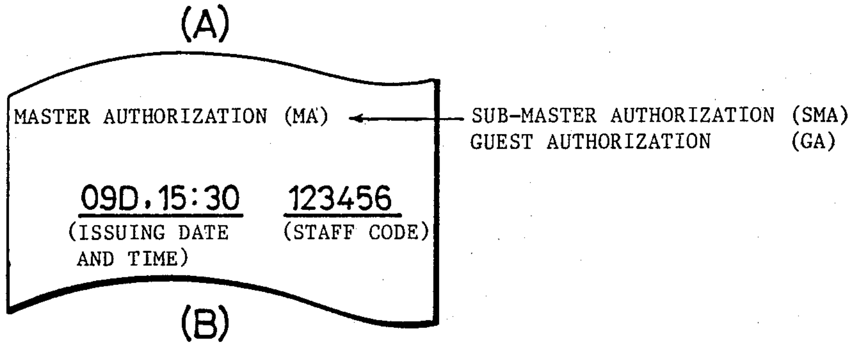
(B)
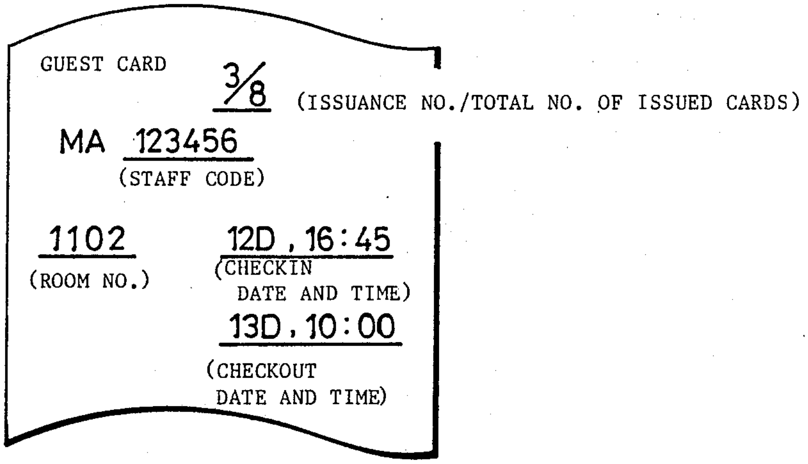
(C)
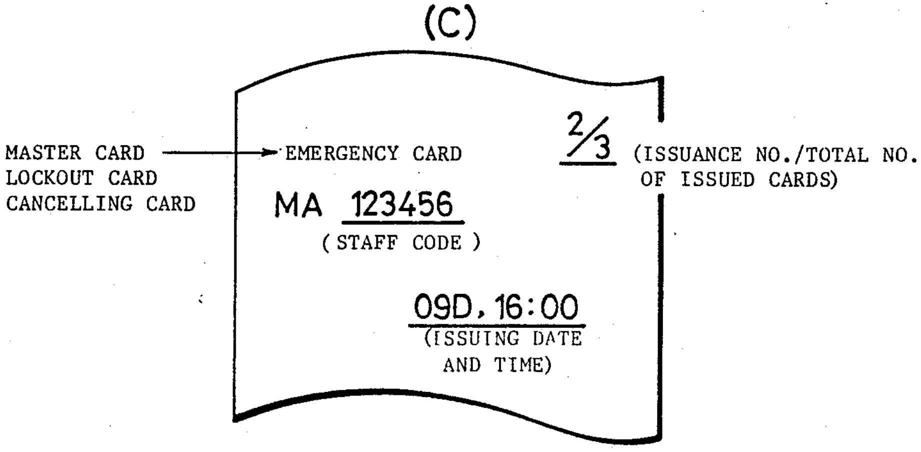

FIG. 22b
(D)
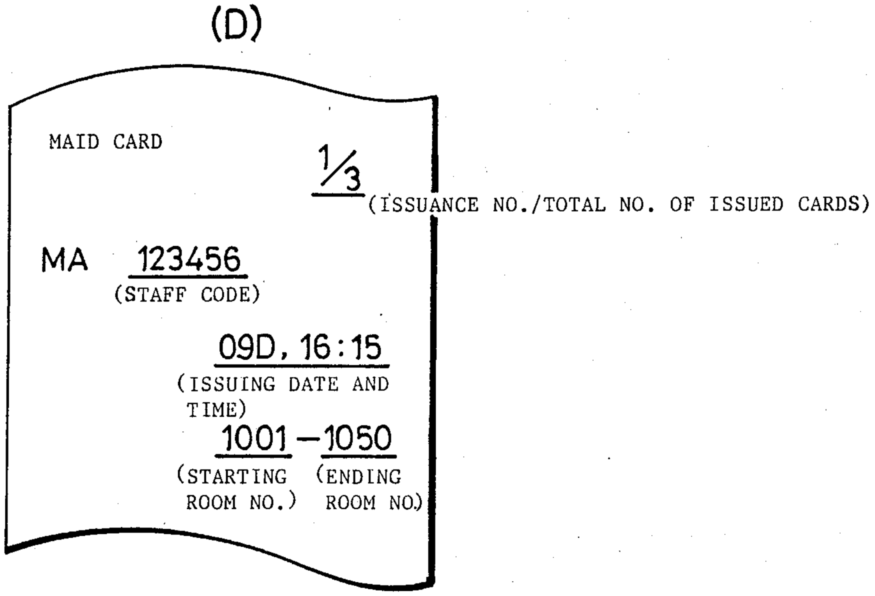
(E)
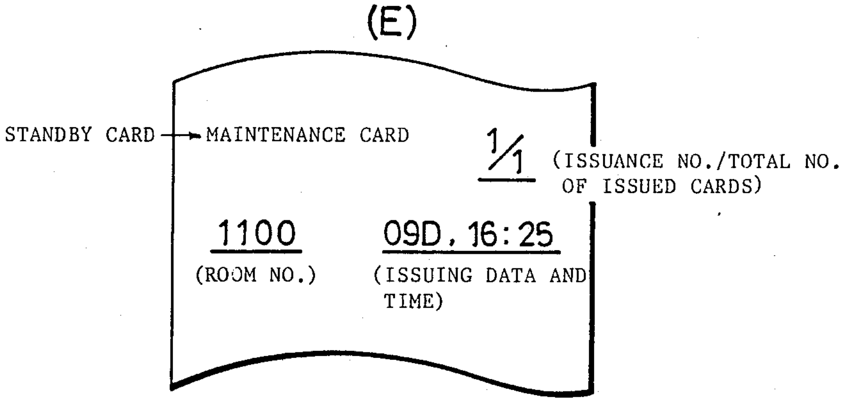

METHOD OF AND SYSTEM FOR ISSUING CARDS

This application is a continuation of U.S. application Ser. No. 919,566, filed Oct. 20, 1986, now abandoned, which is a continuation of Ser. No. 711,416, filed Mar. 13,1985, now abandoned.

CONTENTS

BACKGROUND OF THE INVENTION

Technical Field
Prior Art

SUMMARY OF THE INVENTION

BRIEF DESCRIPTION OF THE DRAWINGS

DESCRIPTION OF EMBODIMENTS

Figure 1:
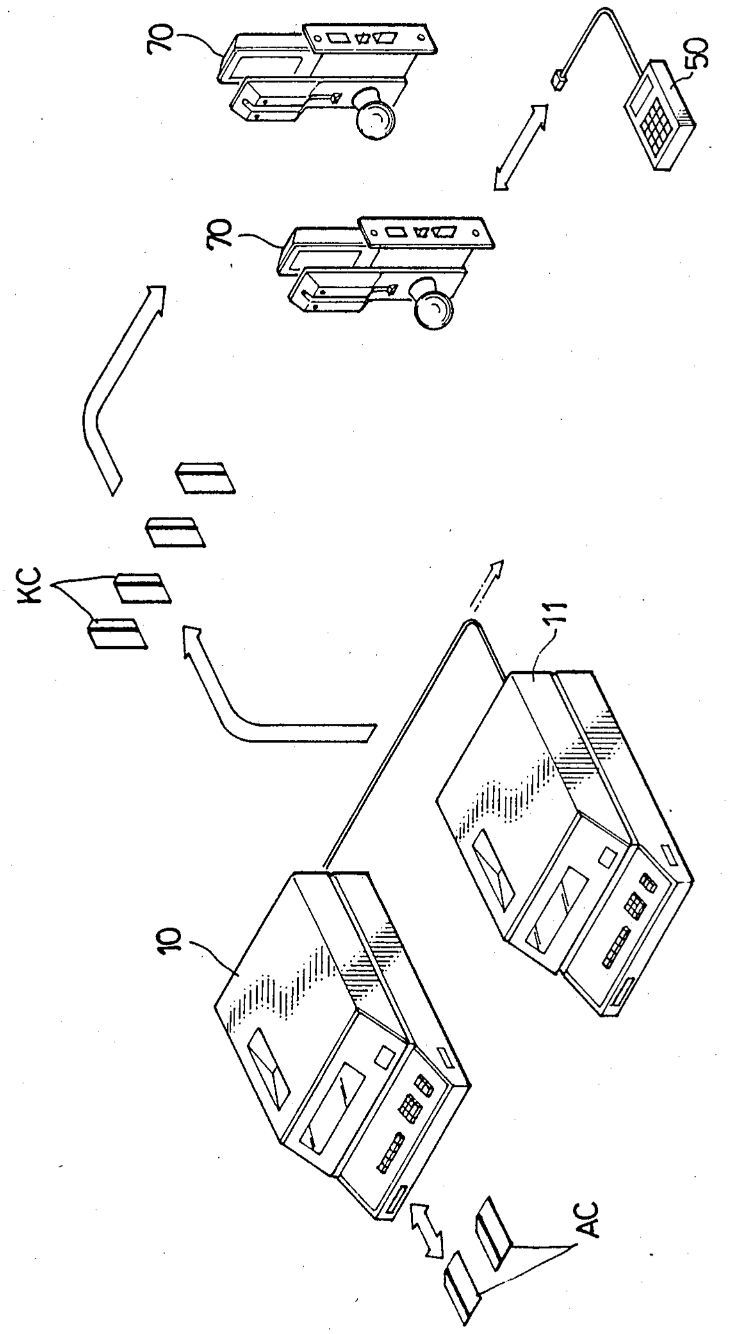

1. Outline of Hotel Card Lock System
2. Kinds of Cards and Their Security Levels
3. Card Data and Unlocking Method
4. Construction of Card Issuing Console
5. Outline of Authorization Card Issuing and Initial Data Setting Procedures
6. Main Routine for Card Issuing Console and Process with GR Card
7. Process for Issuing GR Card
8. Process for Setting, Changing and Printing Initial Data
9. Process for Issuing MA, SMA and GA Cards
10. Process with MA Card
11. Process for Issuing Guest Card
12. Room Cancelling Process
13. Totalling Process
14. Process for Monitoring Card Data
15. Process for Issuing Key Cards Other Than Guest Cards
16. Processes with SMA Card GA Cards
17. Construction of Data Input Unit
18. Construction of Card Lock Unit
19. Initial Data Input/Output Process with Data Input Unit
20. Other Operation of Data Input Unit
21. Unlocking Process in Card Lock Unit
   (1) Kinds of Key Card Validity Checks
   (2) Checks Common to All Types, of Key Cards
   (3) Display of Invalidity key Cards
   (4) Emergency Card
   (5) Unlocking and Battery Check
   (6) Master Card
   (7) Maid Card
   (8) Guest Card
   (9) Maintenance Card
   (10) Lock-Out Card
   (11) Cancelling Card
   (12) Standby Card
22. Features and Modifications of Embodiment
   (1) Secrecy of Hotel Code
   (2) Security of GR Card
   (3) Security of MA, SMA and GA Cards
   (4) Security of Key Card Issue
   (5) Card Issuing System
   (6) Card Issuing Console Having Two Card Readers
   (7) Usefulness of Card Issuing Console and Authorization Cards in Hotel System
   (8) Two Types of Guest Cards
   (9) Issue of a Plurality of Identical Guest Cards

(10) Reissue of Guest Card
   (11) Use of Paper Cards
   (12) Re-Registration of Card Data
   (13) Initial Data Input/Output with Data Input Unit
   (14) Other Functions of Data Input Unit
   (15) Sequence Number Cancellation in Card Lock Unit
   (16) Lockout of Room and Unlocking
   (17) Two Functions of Cancelling Card
   (18) Battery Check for Card Lock Unit
   (19) Dead Bolt and Key Cards
   (20) Emergency Card
   (21) Master Card
   (22) Maid Card
   (23) Maintenance Card
   (24) Standby Card

BACKGROUND OF THE INVENTION

1. Technical Field

The present invention relates to a method of and a system for issuing cards, and more particularly to a method of and a system for issuing cards of high level to lower level successively in the descending order of their level.

2. Prior Art

Cards having a magnetic recording surface have found wide use in various fields. They vary widely in function and use. For example, bank cards and credit cards are used to authorize the user for transactions, while key cards substitute for mechanically unlocking keys. However, any of the conventional cards is adapted to serve a particular purpose when it is used after having been issued, and the card issuing machine merely has the function of issuing cards. It has not been conceived that the card is to give a security to the operation of the card issuing machine; it is current practice to mechanically lock the card issuing machine.

When a mechanically operable key is lost, the portion of the card issuing machine associated therewith needs replacement. Further the card issuing machine can be operated by any person irrespective of his qualification, provided that he carries the specific key.

The magnetic card is adapted to record a relatively large amount of data which can be secured effectively and is therefore suited to the foregoing uses of which reliability is required.

SUMMARY OF THE INVENTION

The main object of the present invention is to provide a card issuing method and a system therefor in which use is made of the high security of magnetic cards and by which a card intended for particular use is issued with use of a card of higher security.

The present invention provides a method of issuing cards by using a card issuing machine including a memory having stored therein an initial secret code, a card reader and a keyboard, the method being characterized by checking whether a secret code keyed in matches the initial secret code stored in the memory; storing in a memory a code keyed in for associating a first card with the card issuing machine and recording the associating keyed-in code in the first card by the card reader to issue the first card when the two secret codes are found to match; issuing a new card upon confirming a keyed-in first secret code of the first card; and issuing another new card upon confirming a secret code of the new card issued.

Examples of suitable cards are those having a magnetic recording surface, while it is also possible to use IC cards or the like having a microprocessor and a memory incorporated therein. Accordingly, useful card readers include not only a magnetic card reader-writer but also a device by which data is sent to or received from such IC cards. Further the concept of cards includes also those of slightly reduced size which are called tickets.

The first card is issued by the card issuing machine on condition that the secret code keyed-in matches the initial secret code stored in the memory of the machine. At this time, a code for associating the first card with the card issuing machine is keyed in and stored in the first card and in the machine. With the issue of the first card, the first card is closely associated with the issuing machine. The first card is of the highest level and serves as a key for issuing another card of lower level.

Preferably, the first secret code as to the first card is stored in the memory of the issuing machine. If the issuer of the first card differs from the person who registers the first secret code of the first card issued in the issuing machine, the issuer of the first card can no longer participate in the subsequent issue of cards, hence high security.

The second card can be issued on condition that a secret code keyed in matches the first secret code stored in the card issuing machine. Accordingly, the second card can not be issued by those other than the registerer of the first secret code.

A second secret code as to the second card is similarly stored in the card or in the card issuing machine. The third card of lower level is issued on condition that the second secret code, when keyed in, matches the second secret code in the card data or in the card issuing machine. Accordingly, the third card can not be issued by those other than the specified person bearing the second card.

Thus, only with use of a card of high level, a card of lower level can be issued. This provides a hierarchical card system. Because a card of low level can be issued only by using a card of higher level, high security can be maintained.

Preferably, the code for associating the first card with the card issuing machine is recorded also in the second and third cards, whereby the second and third cards are also closely associated with the machine.

The present invention further provides a card issuing system which is characterized in that the system comprises a card reader for reading card data from a first card, a keyboard for entering a secret code of the first card and data needed for issuing a second card, means for checking a secret code keyed in with the secret code in the card data read from the first card by the card reader or with a secret code accessible by the card data in the first card, a card writer for issuing the second card, and means for controlling the card writer so that when the two secret codes are found to match, specified card data including the keyed-in data is written in the second card by the card writer.

The card issuing system of the present invention is so adapted that the second card is issued with use of the first card on condition that the secret code of the first card matches a keyed-in code, so that the person who is to issue the card can be checked reliably for authorization. The second card can therefore be issued with high security. Further even if the first card gets lost, another first card may be issued. This eliminates the need to repair the card issuing machine.

Preferably, the present system includes a memory having stored therein data specific to the first card for specifying the first card, and means for comparing the data specific to the first card and read by the card reader with the data specific to the first card and stored in the memory so as to issue the second card only when the two secret codes are found to match and the two items of card specific data are found to match. When the first card is lost in this case, the specific data specifying the first card is deleted from the memory, thereby making it no longer possible to issue the second card with use of the first card which is wrongfully obtained. This assures increased security.

These and other features of the present invention will become apparent from the following description of embodiments.

BRIEF DESCRIPTION OF THE DRAWINGS

FIG. 1 is a perspective view generally showing a hotel card lock system;.

Figure 2:
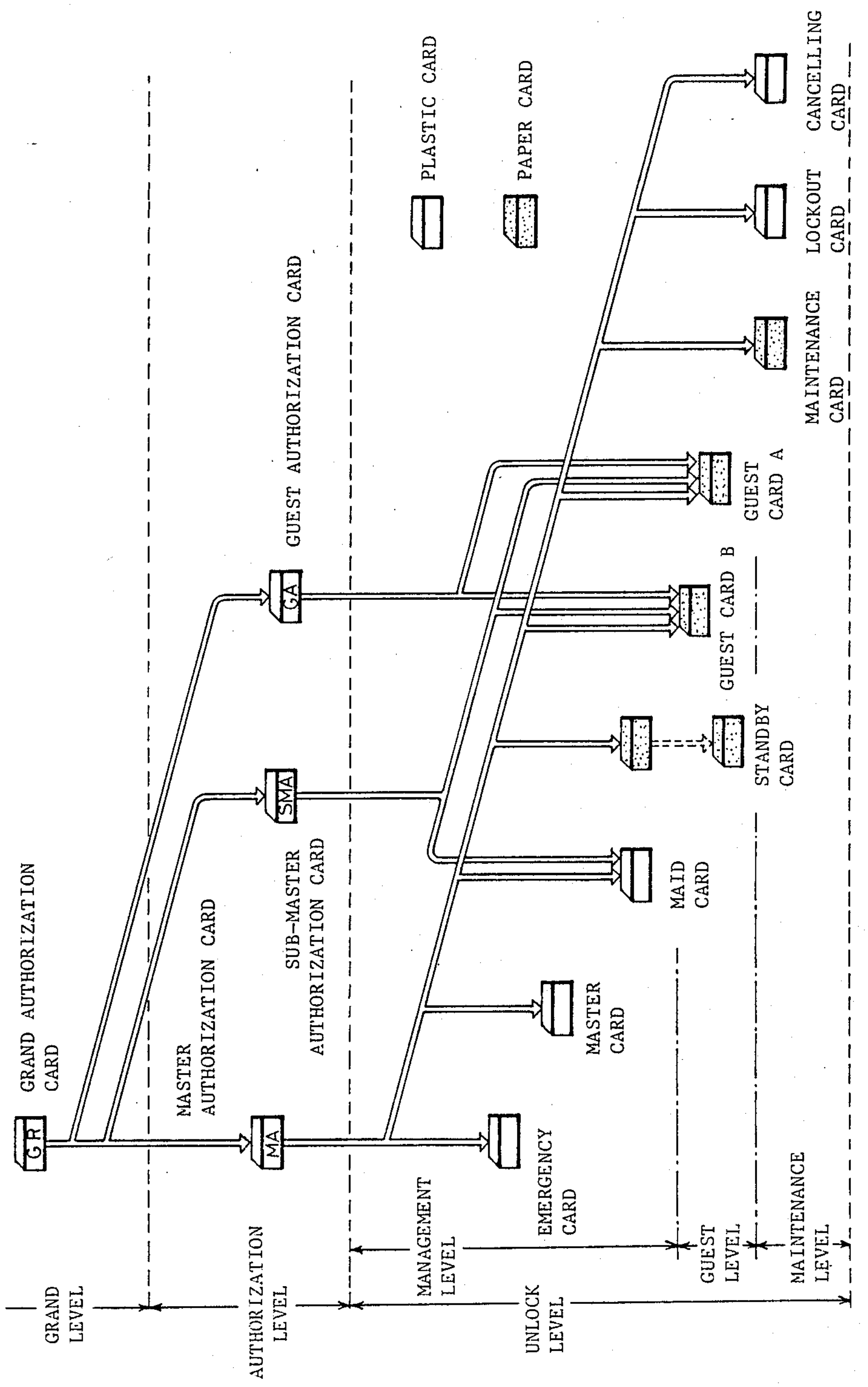
Figure 4:
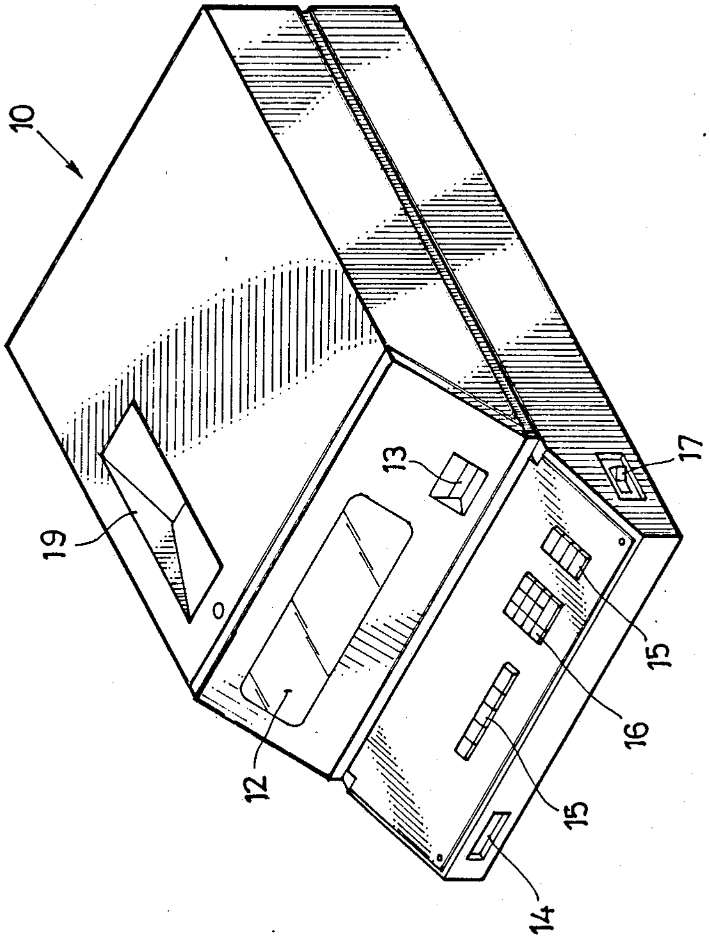
Figure 5:
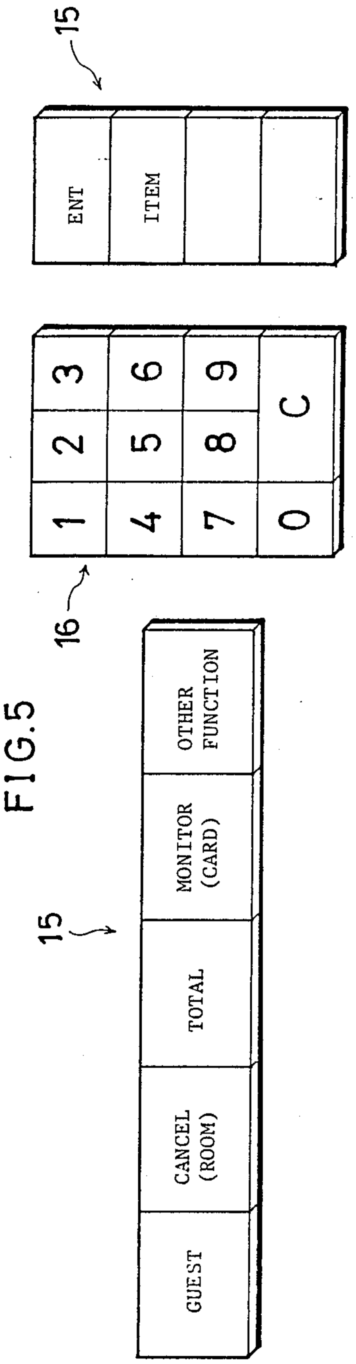
Figure 6:
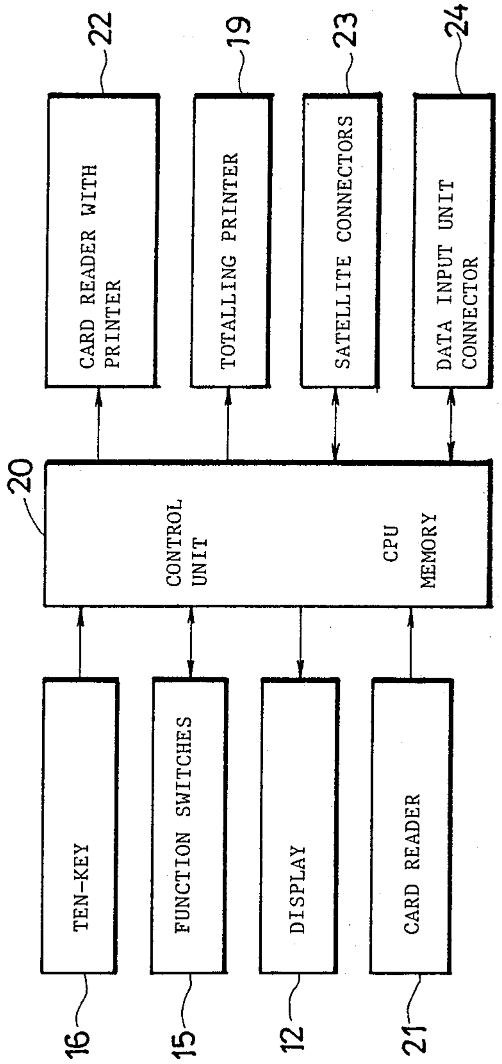
Figure 7:
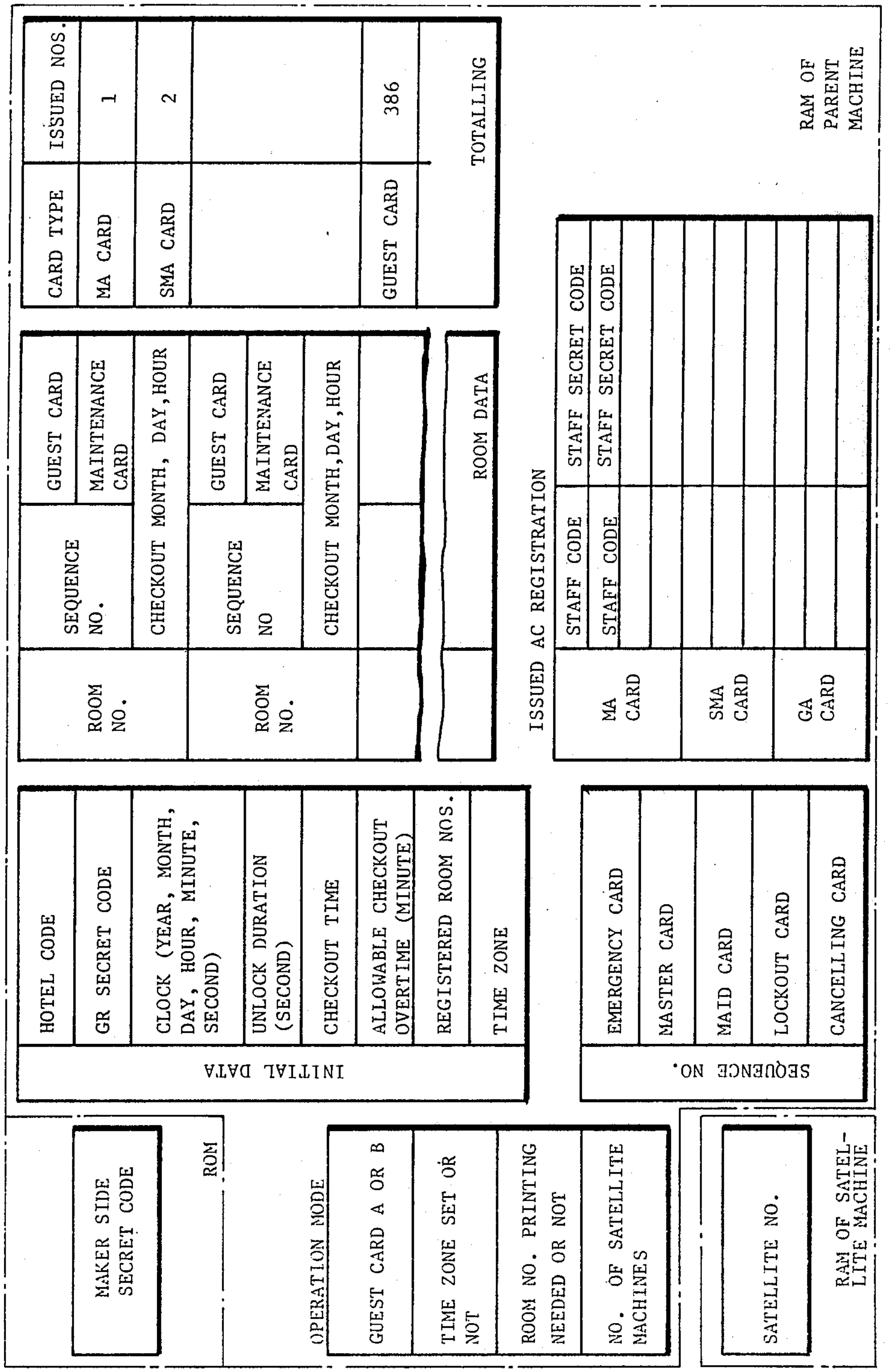
Figure 8:
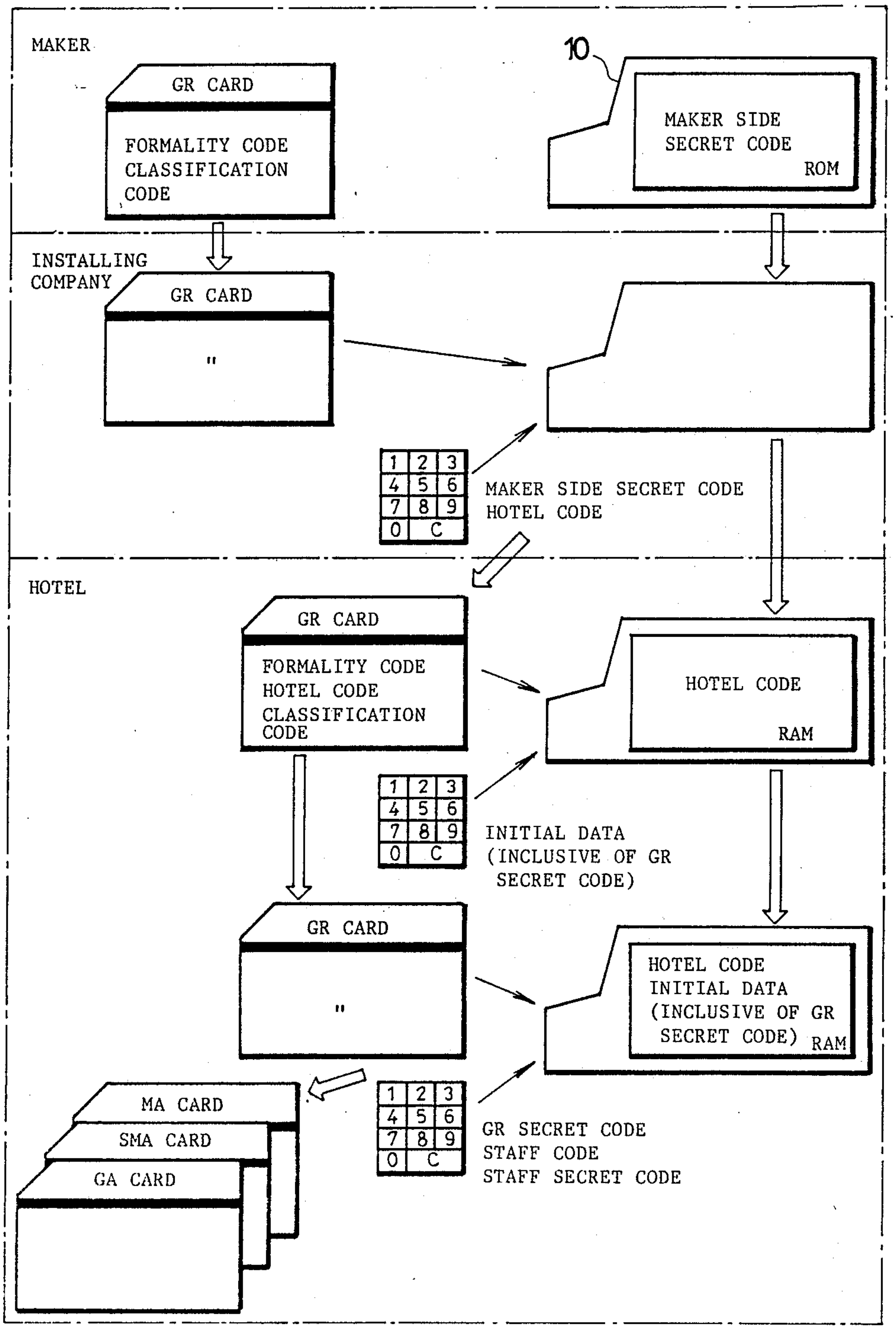
Figure 9:
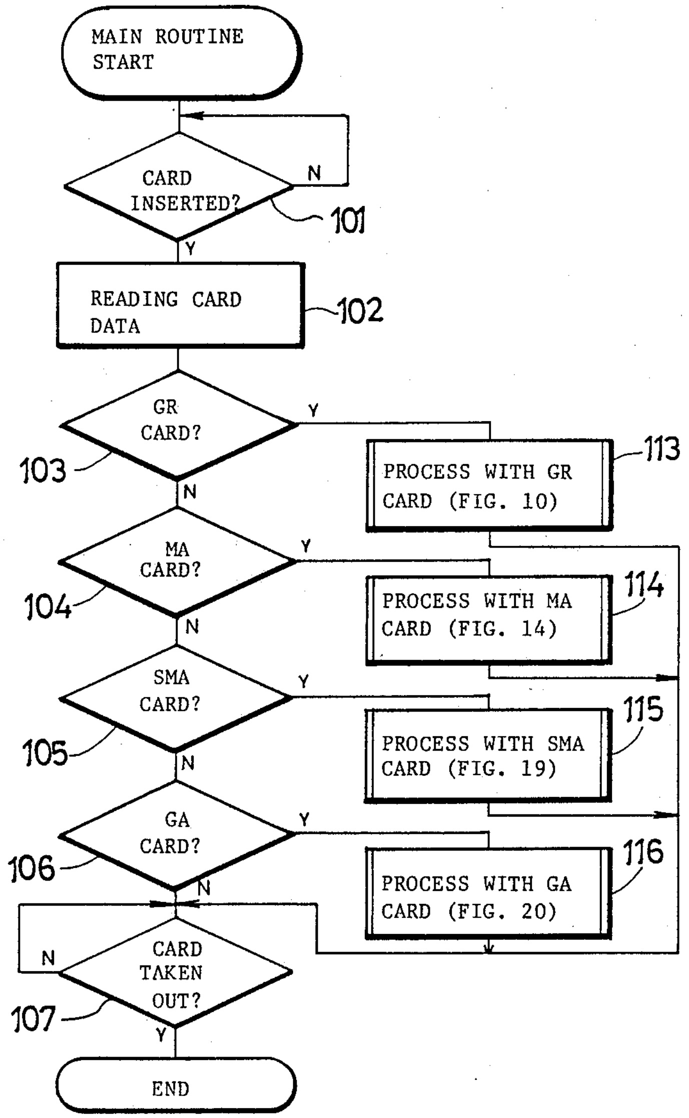
Figure 10:
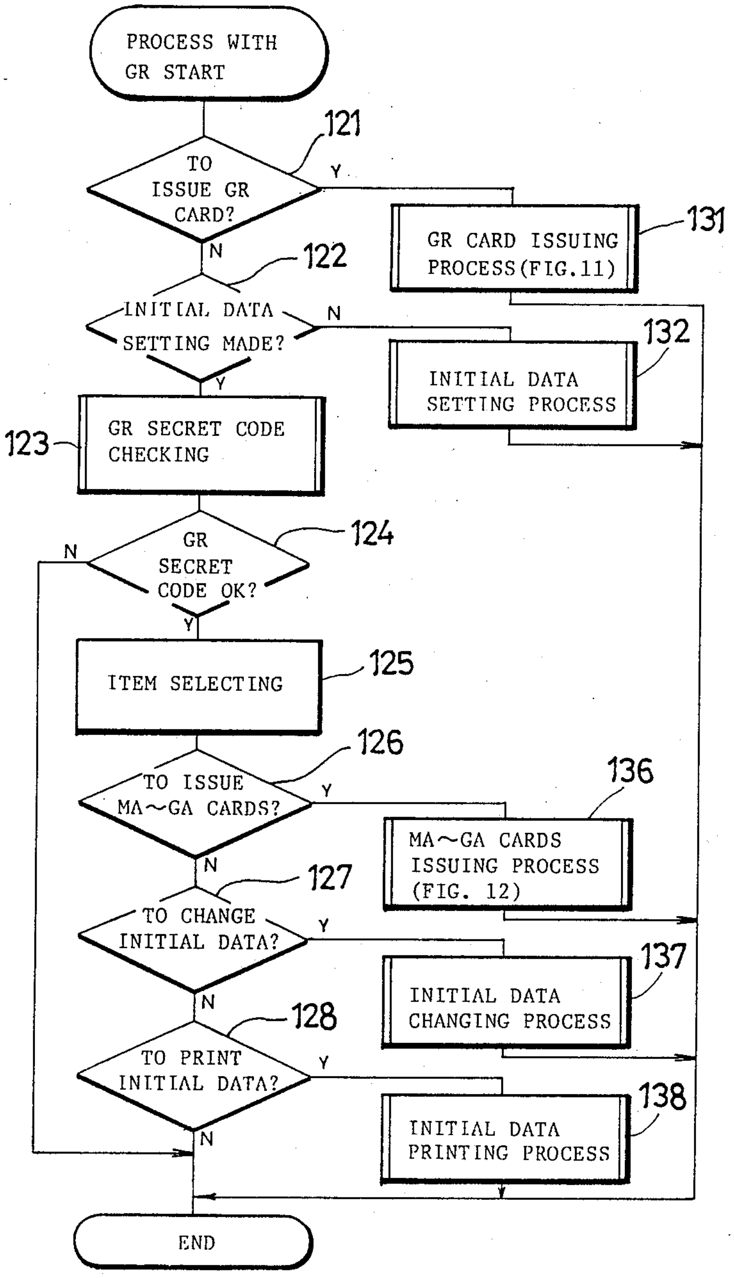
Figure 11:
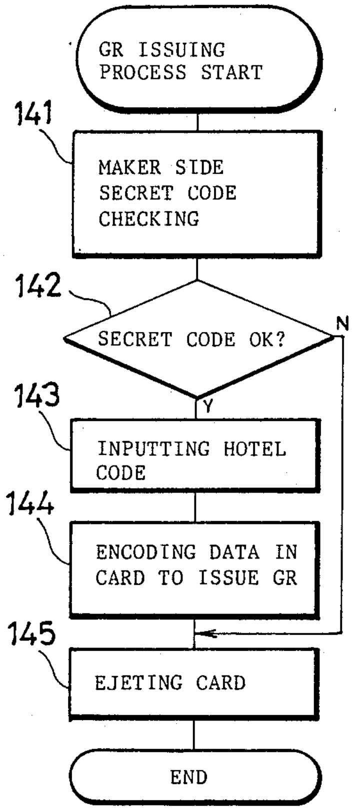
Figure 12:
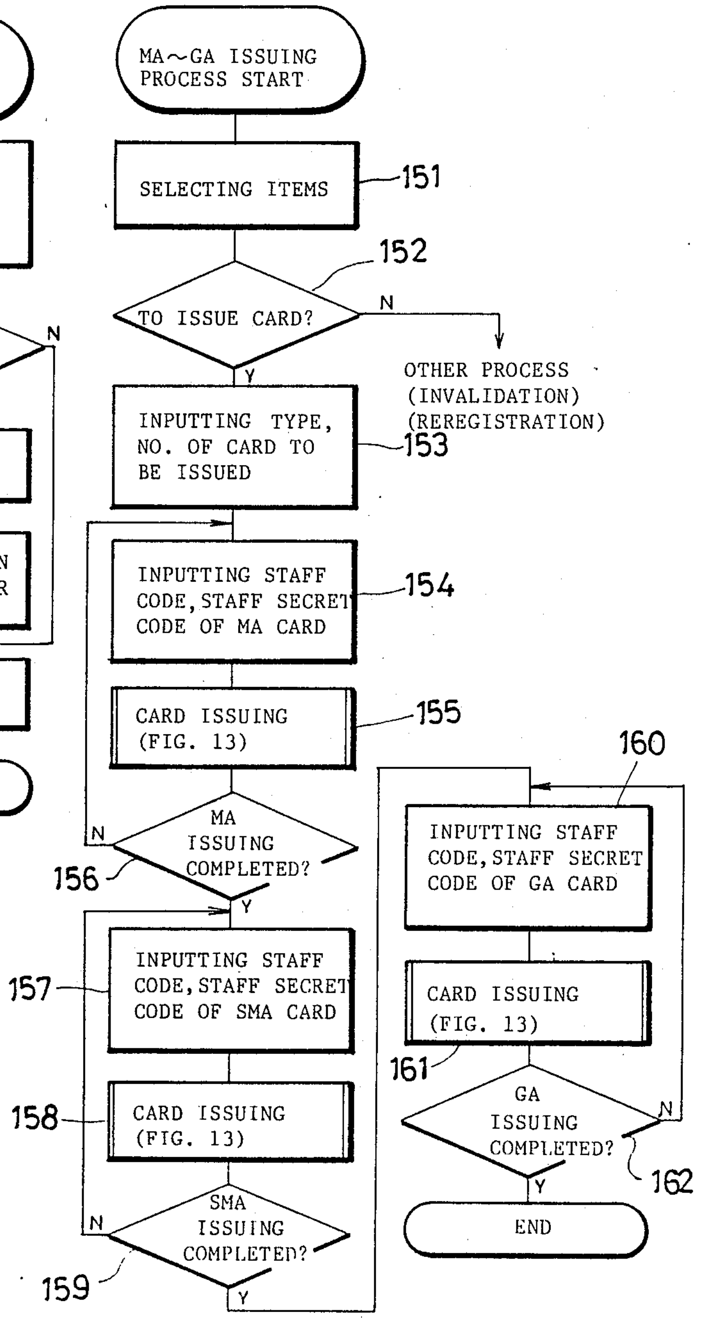
Figure 13:
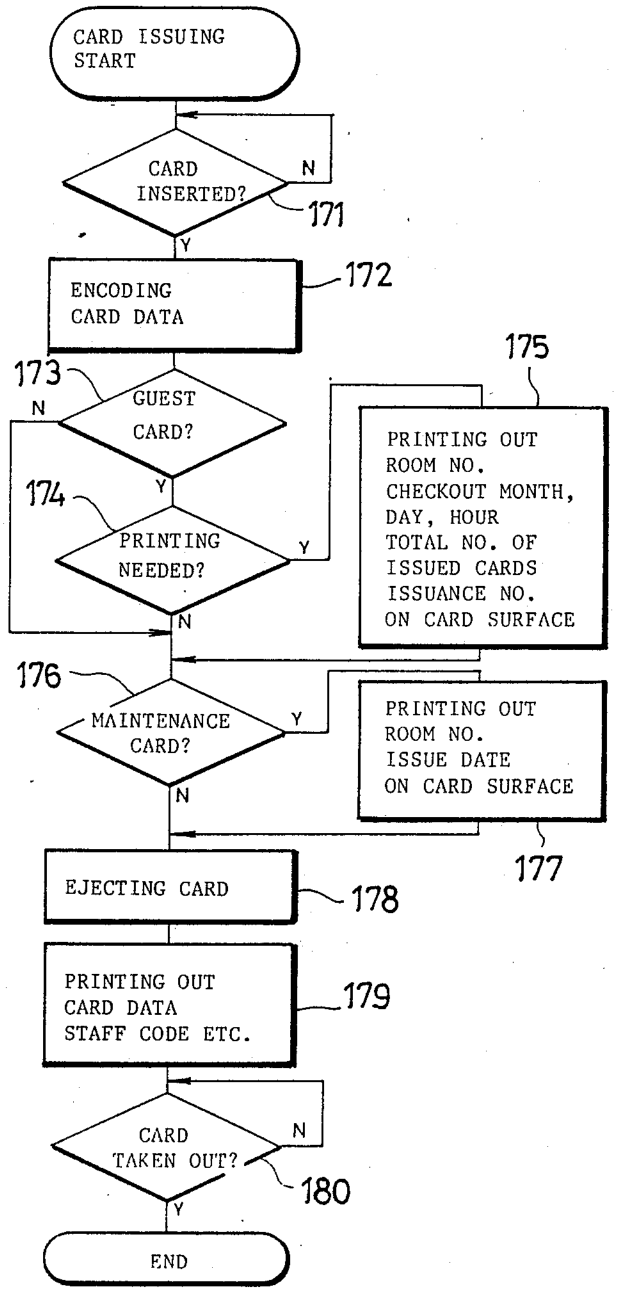
Figure 15:
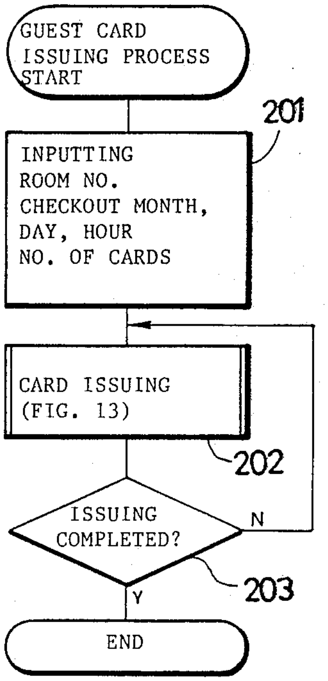
Figure 14:
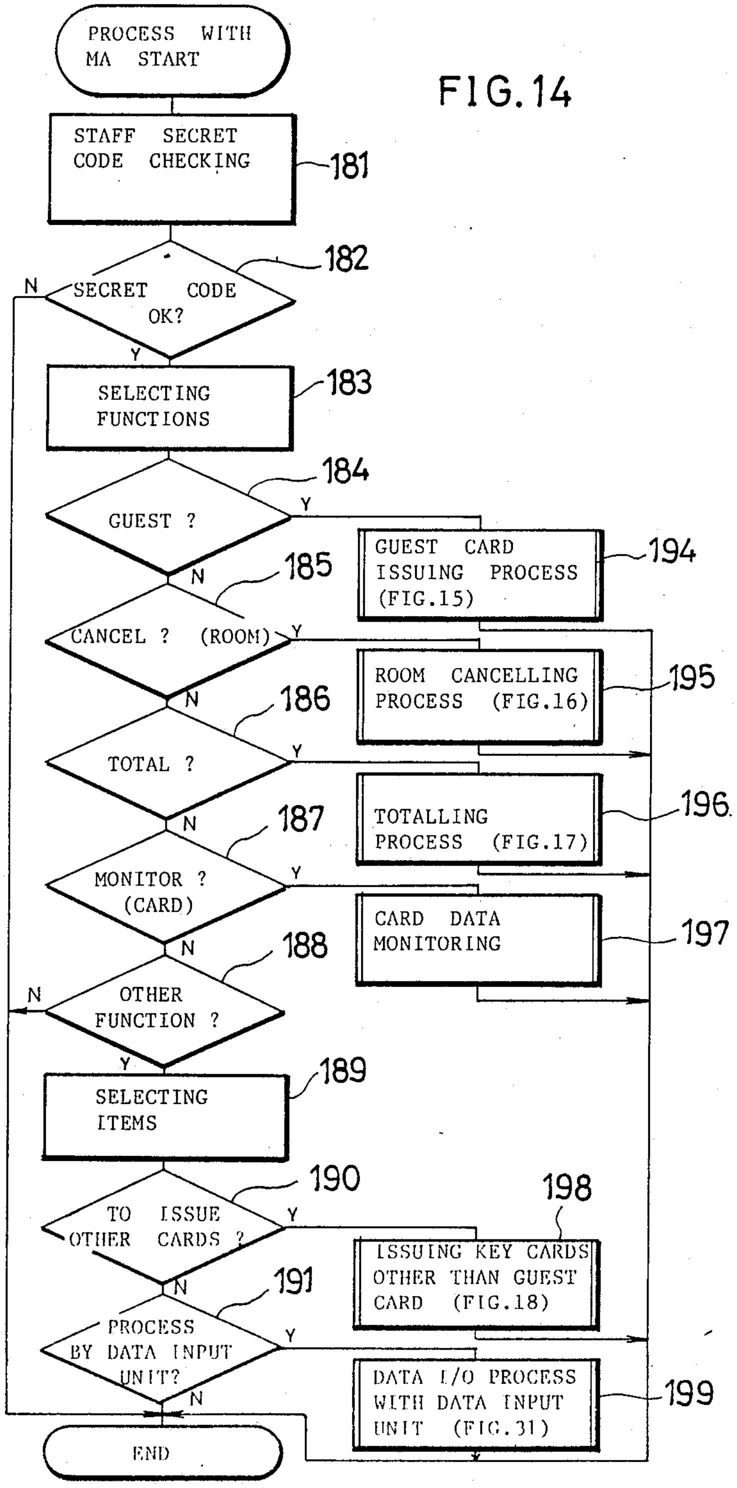
Figure 16:
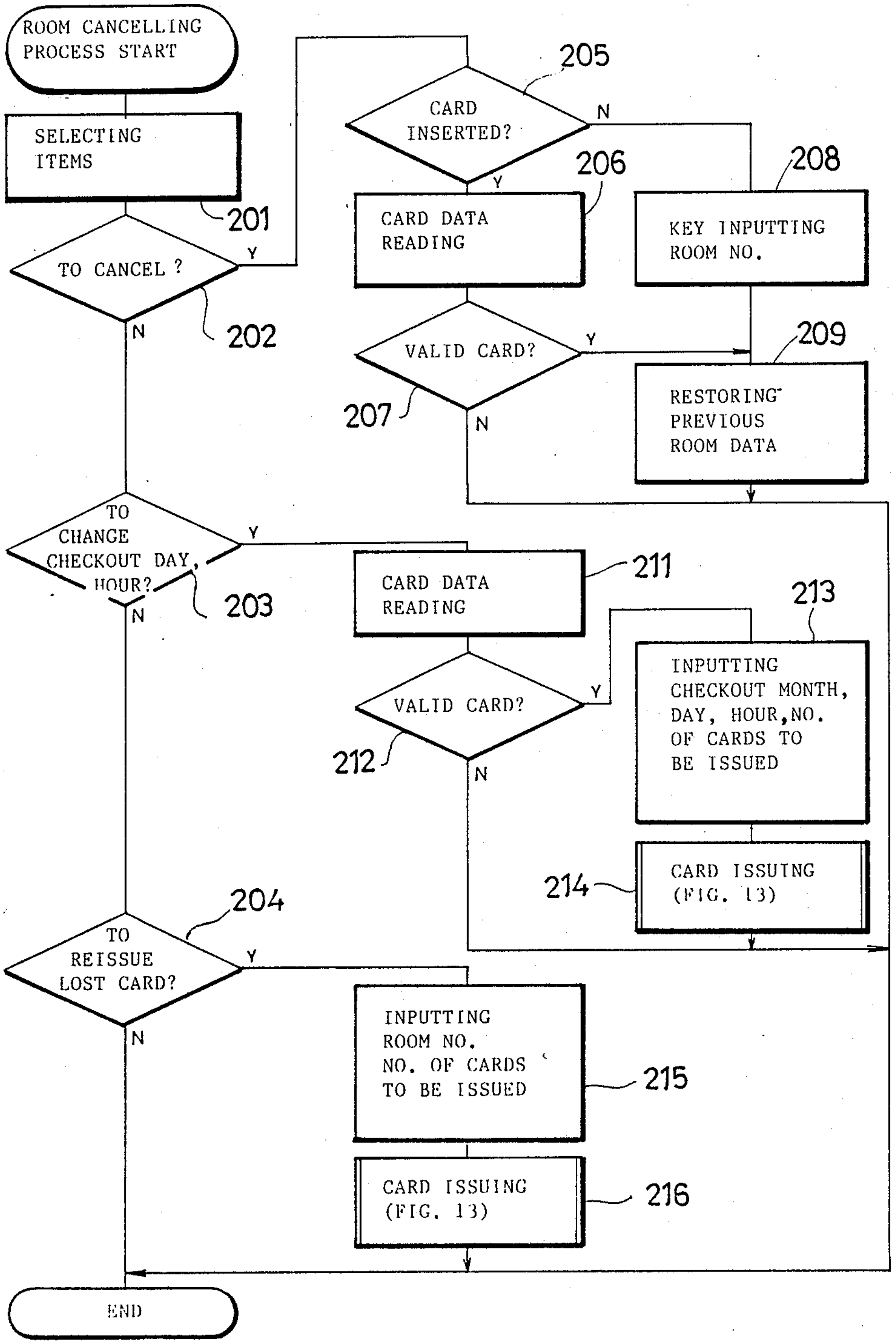
Figure 17:
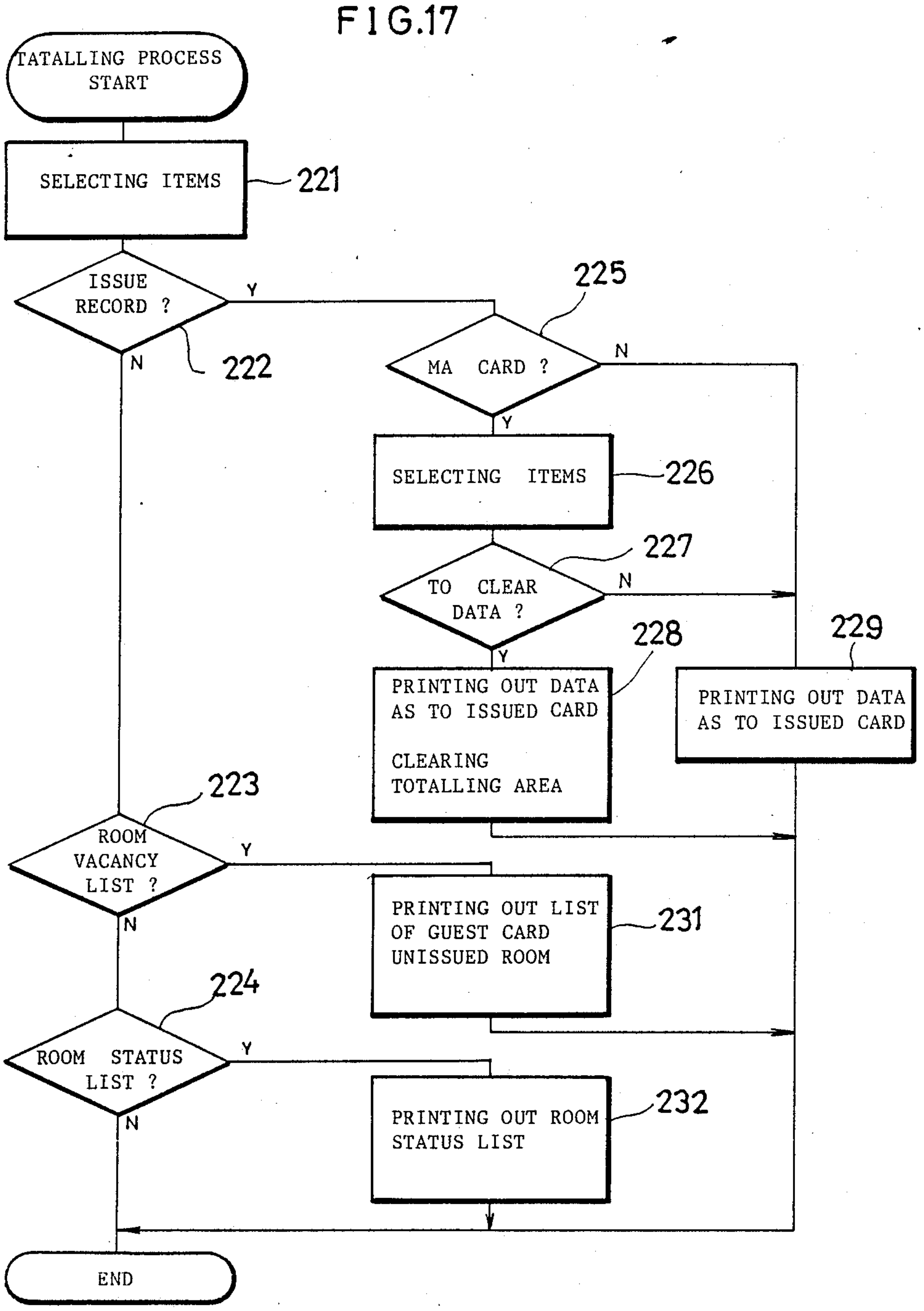
Figure 18:
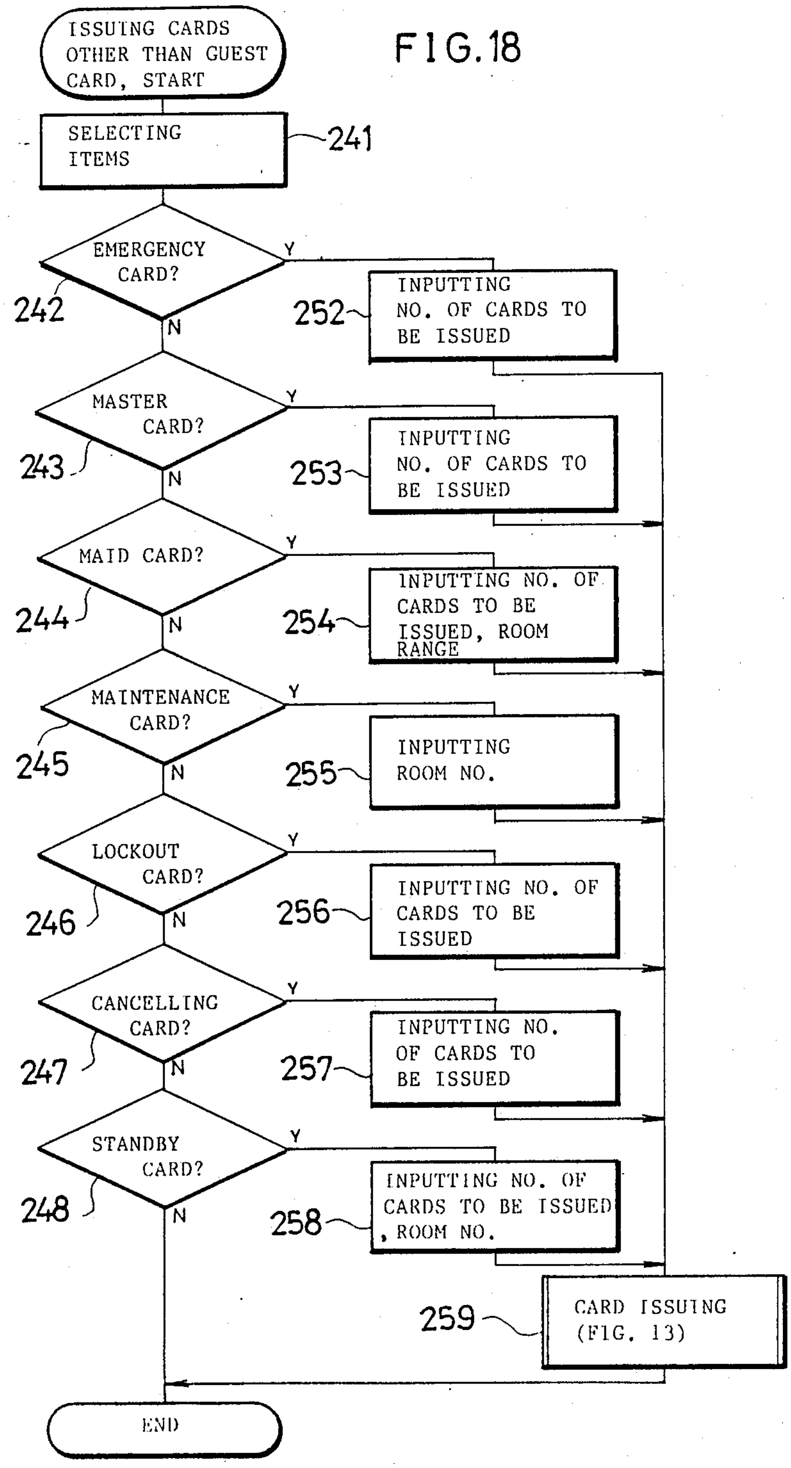
Figure 19:
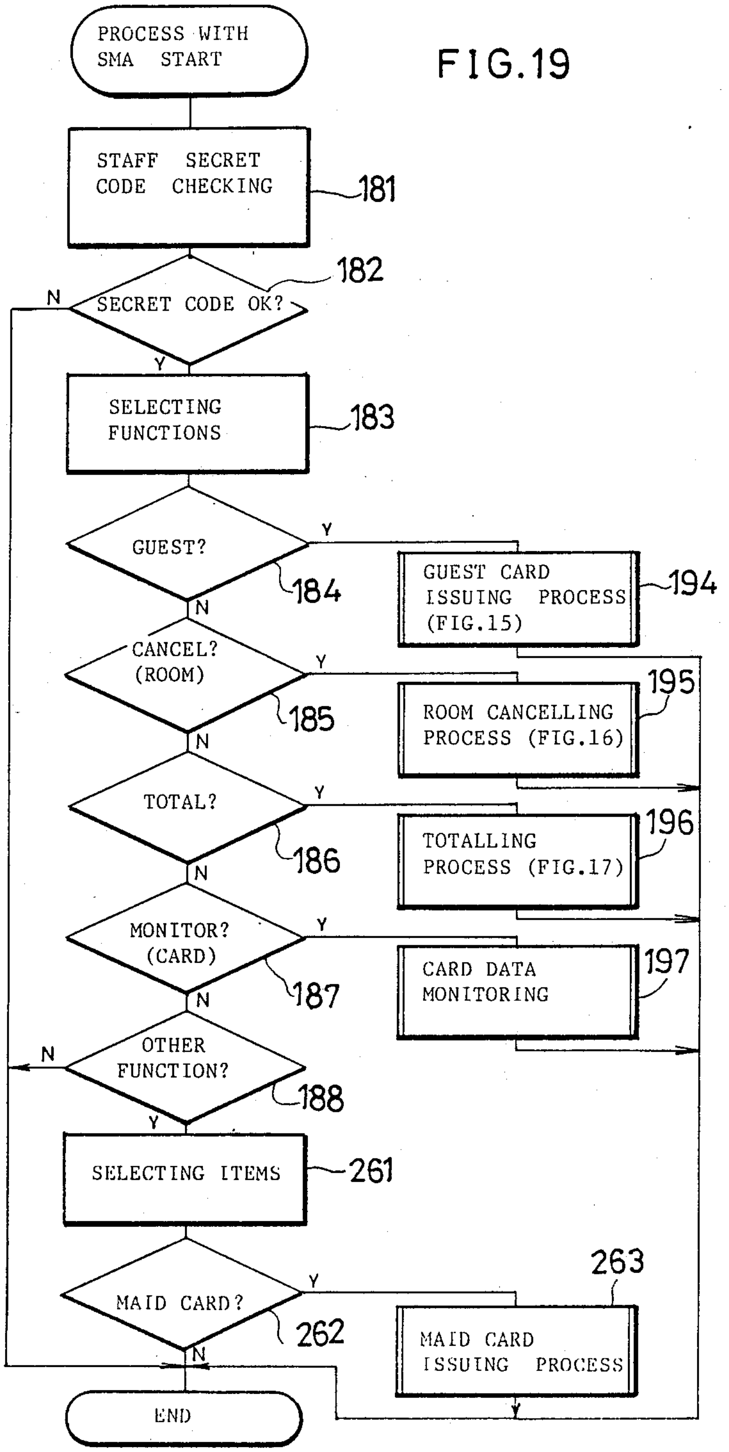
Figure 20:
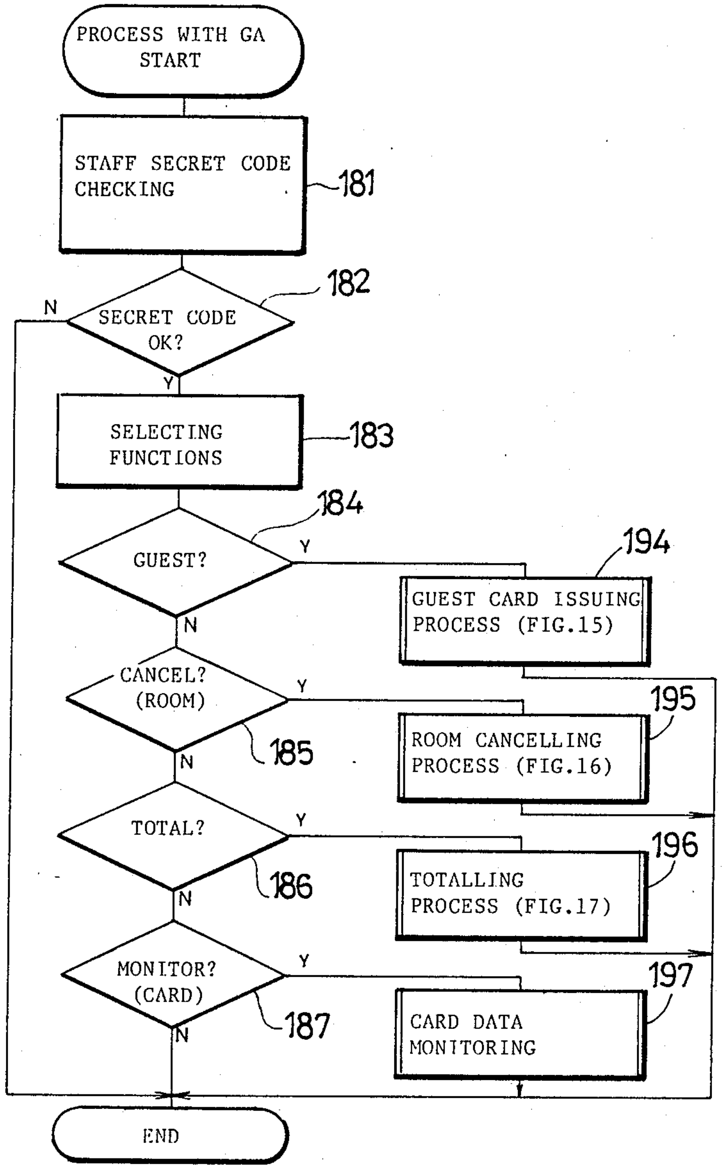
Figure 21:
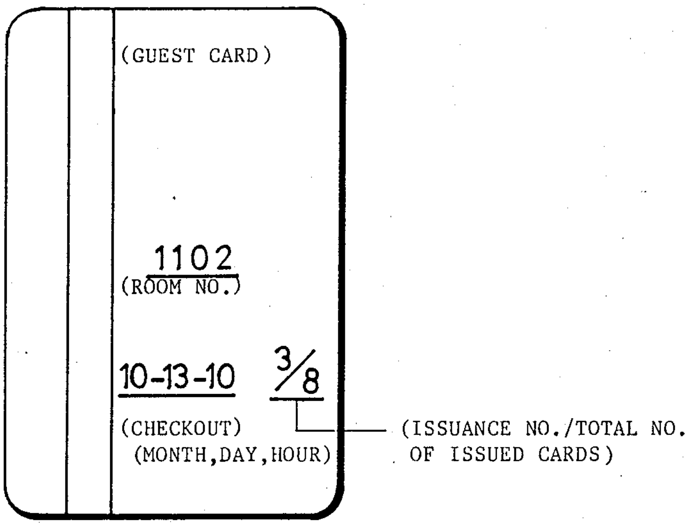
Figure 23:
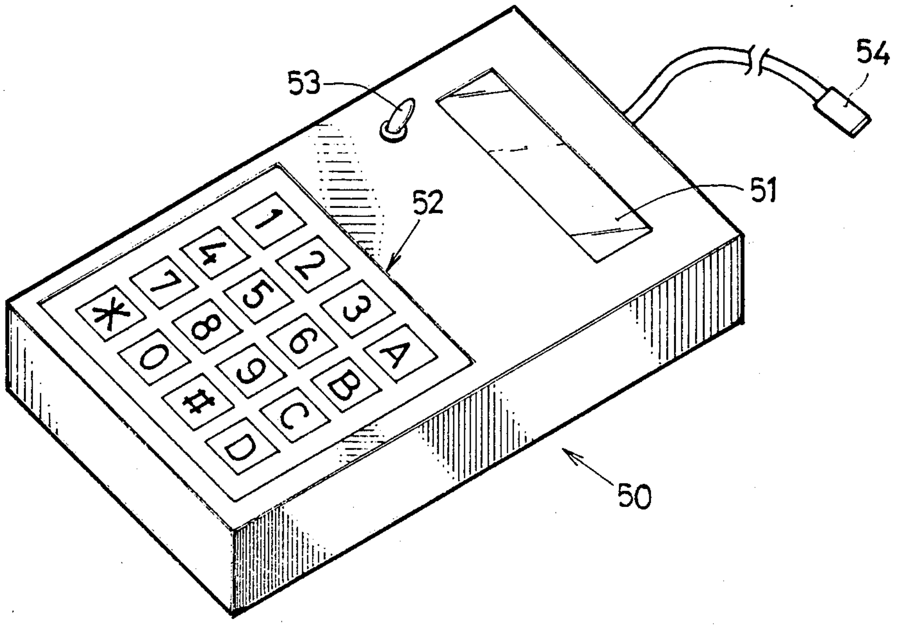
Figure 24:
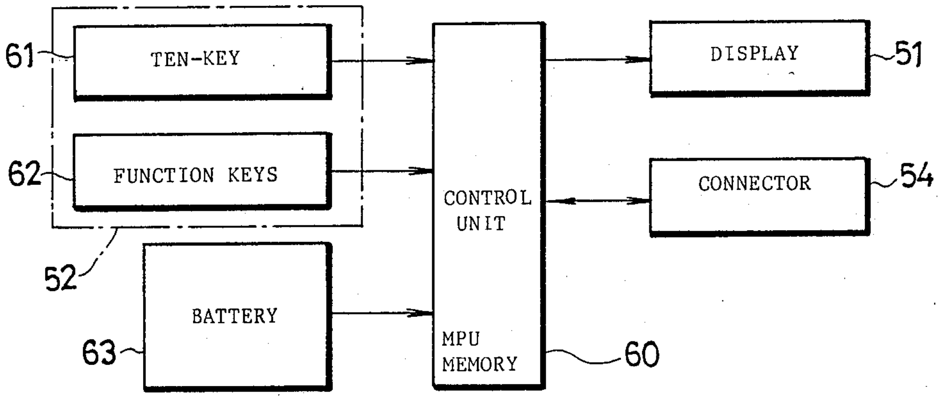
Figure 25:
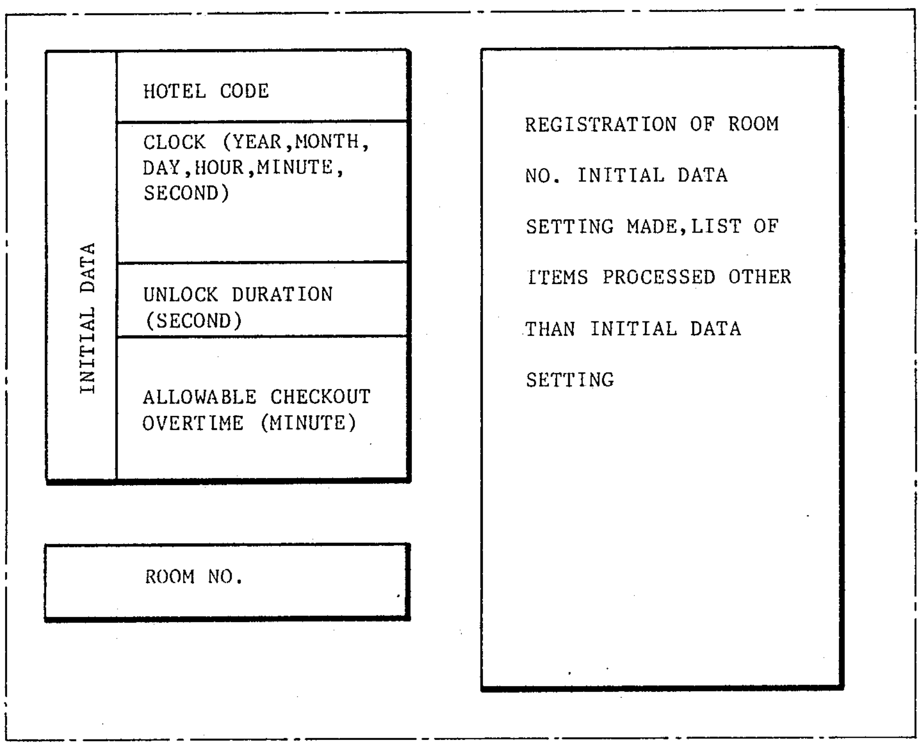
Figure 26:
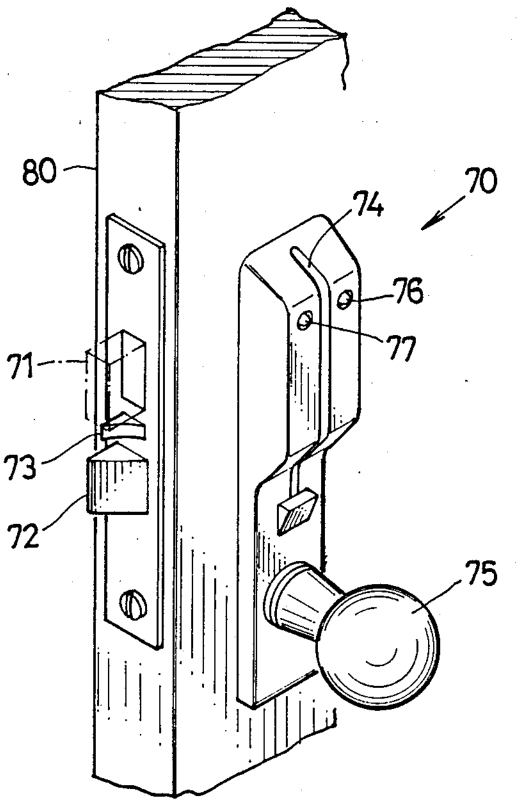
Figure 29:
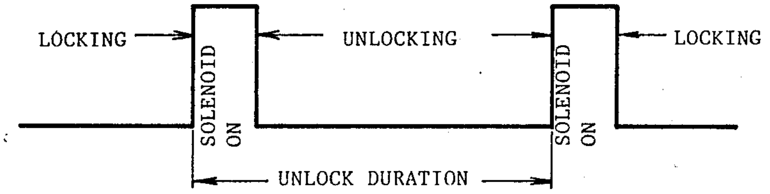
Figure 27:
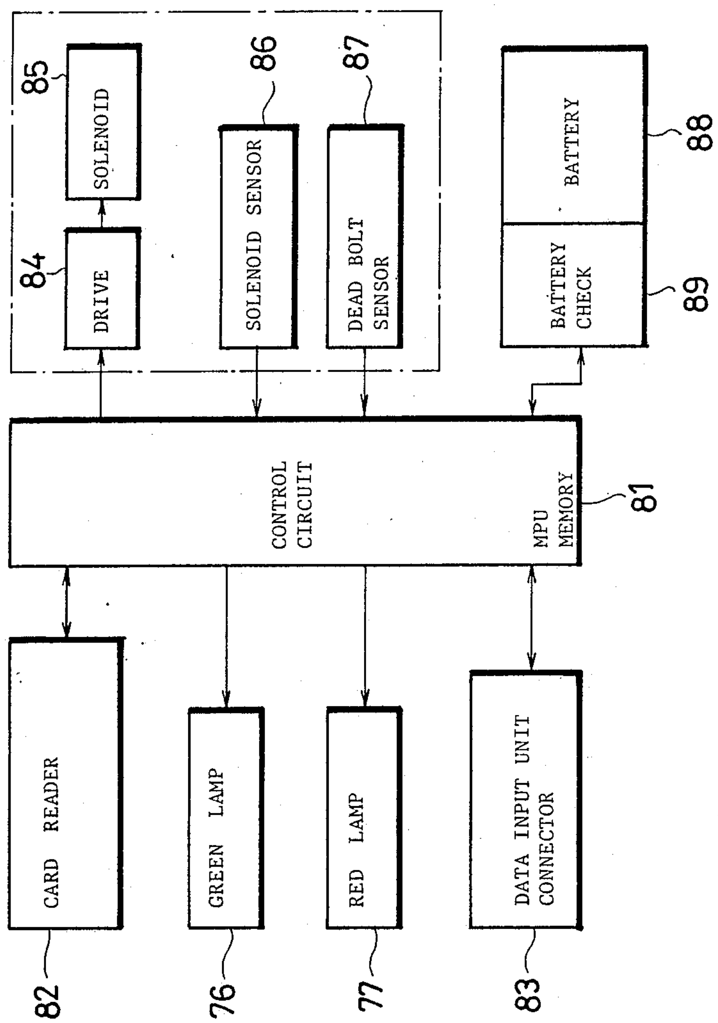
Figure 28:
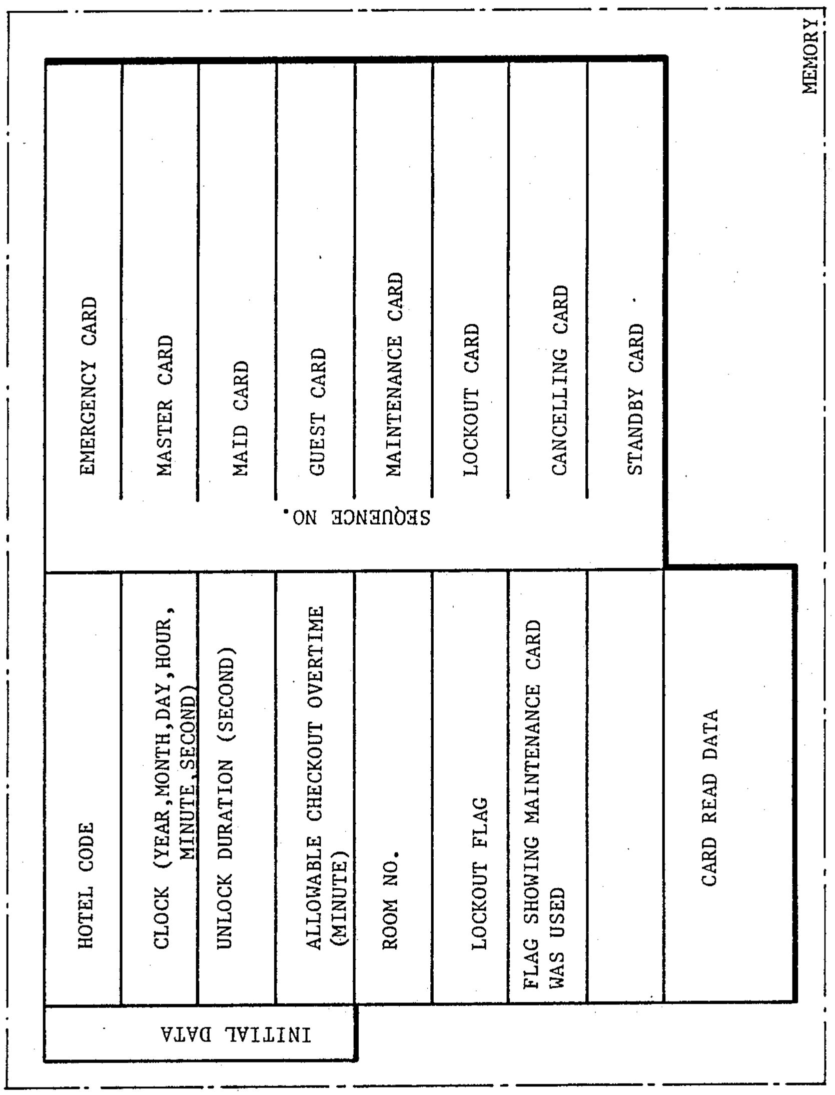
Figure 30A:
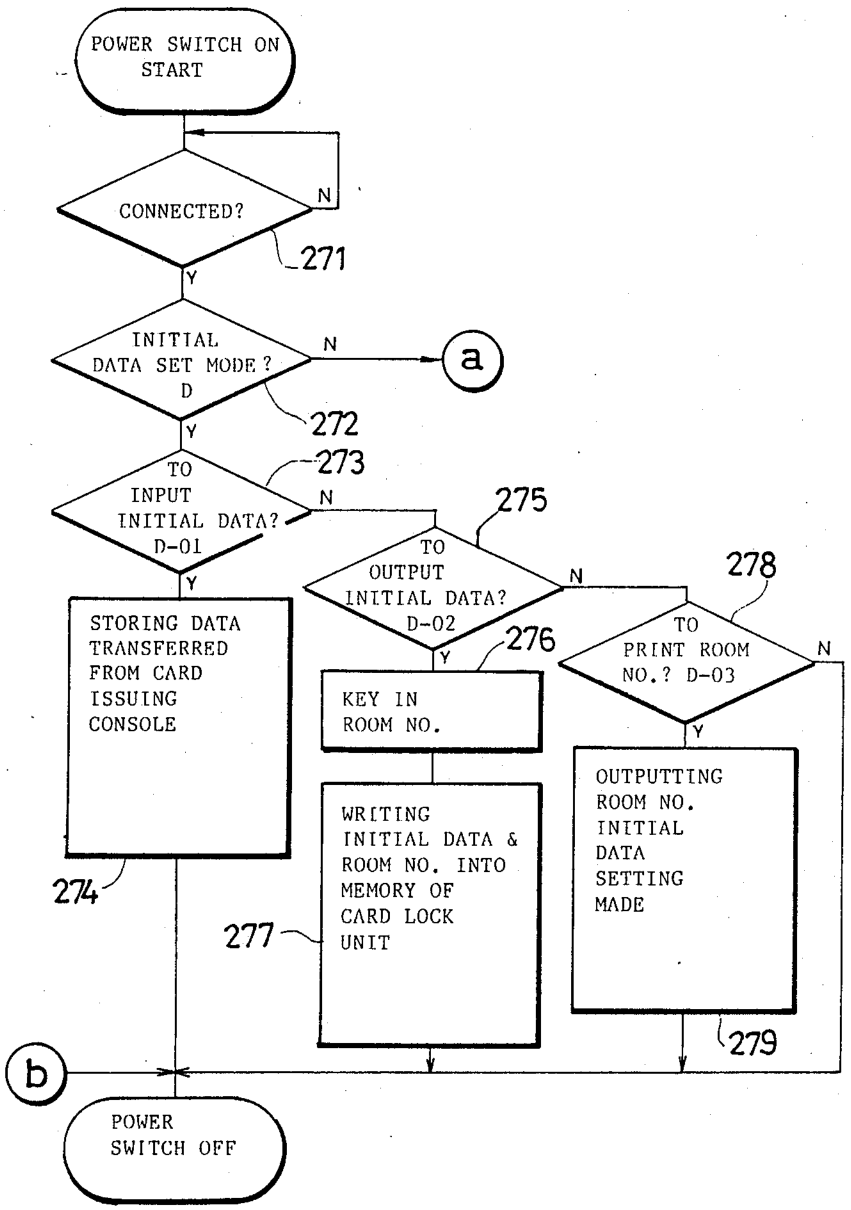
Figure 30B:
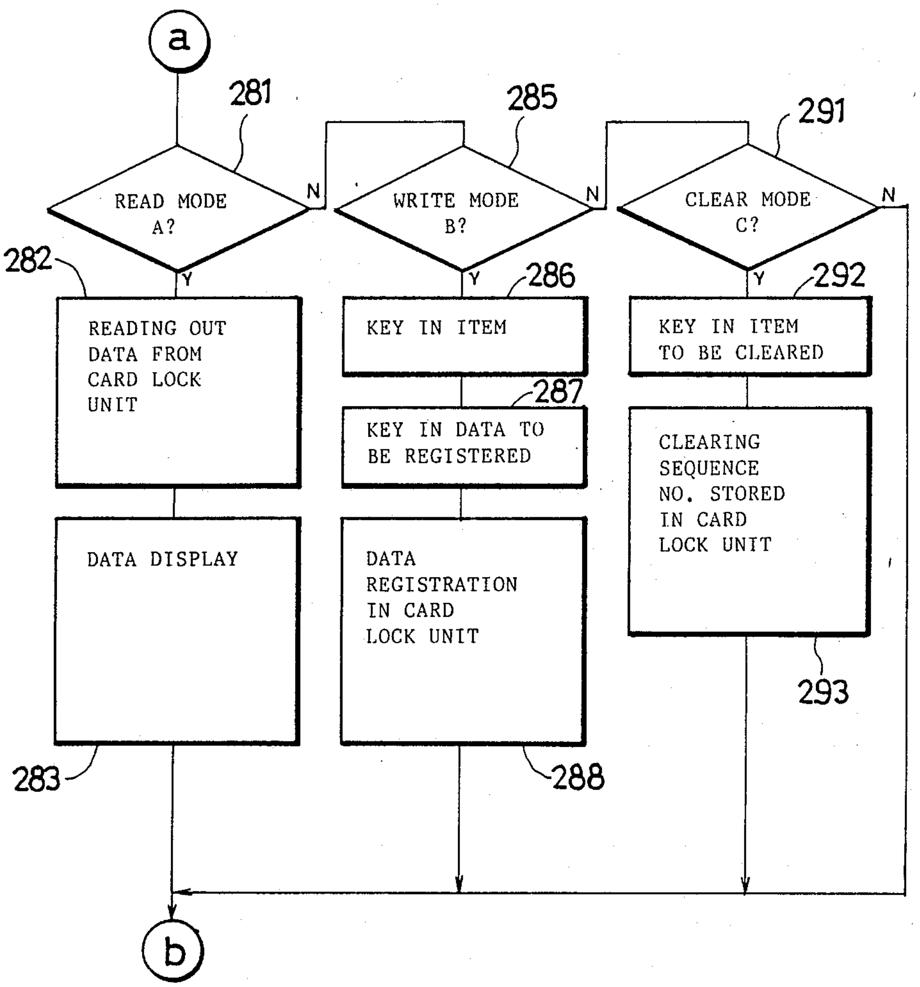
Figure 31:
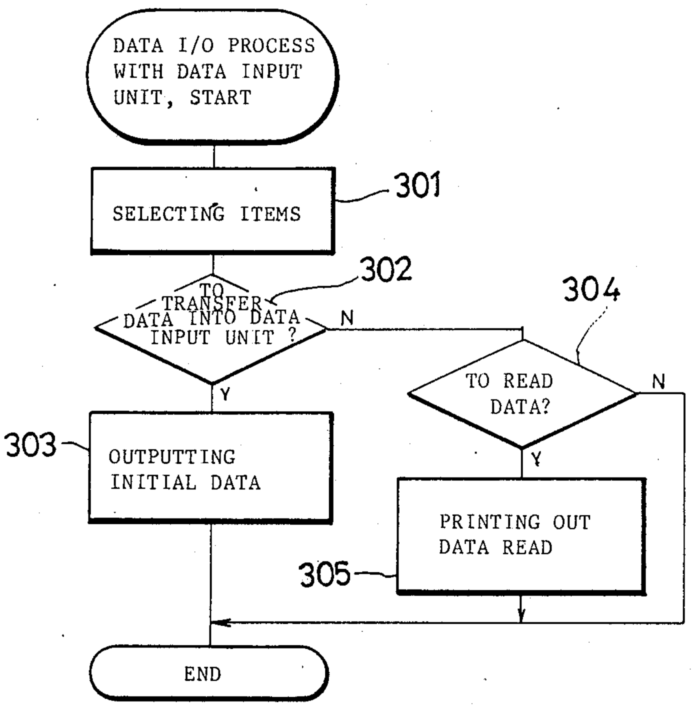
Figure 32A:
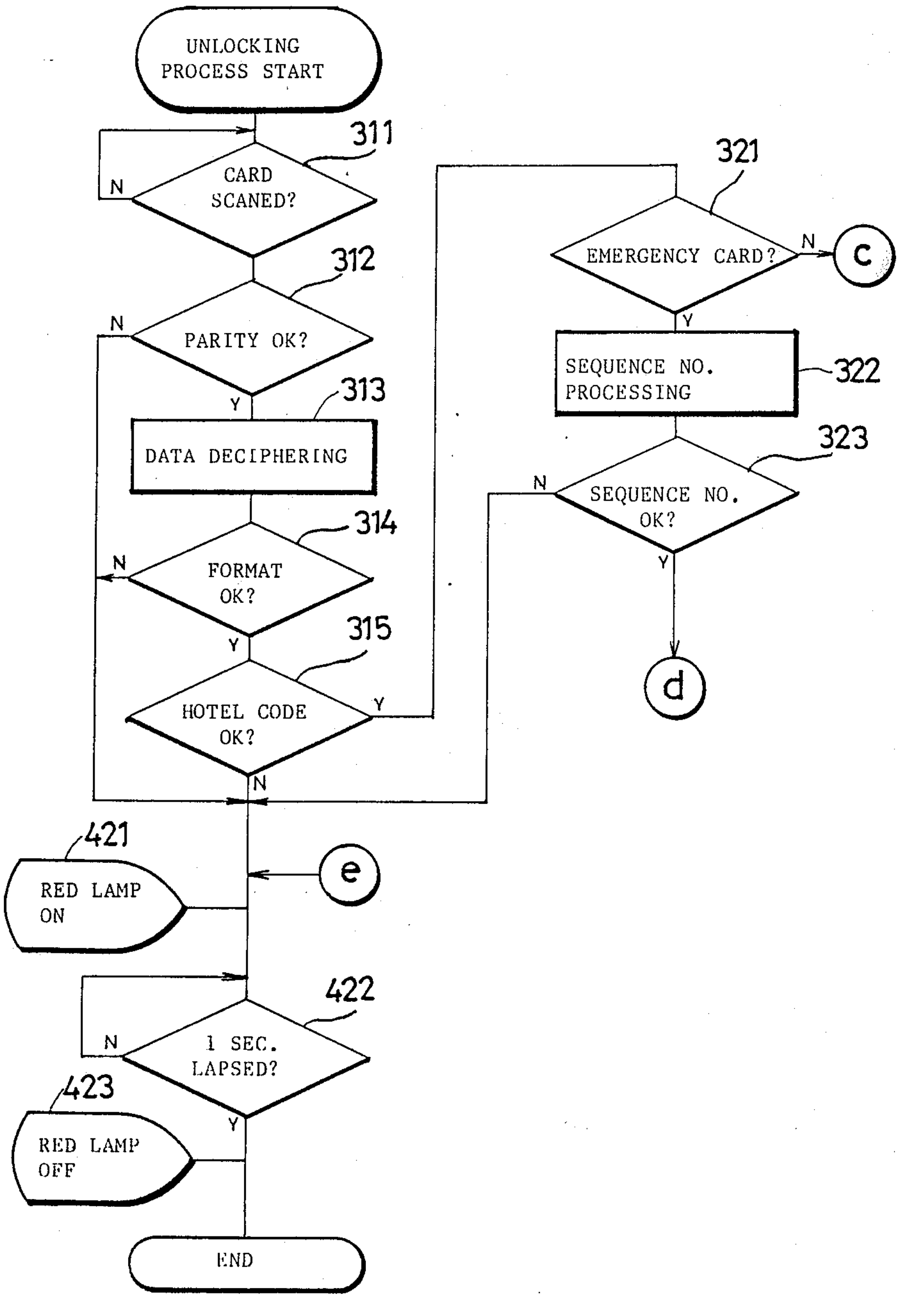
Figure 32B:
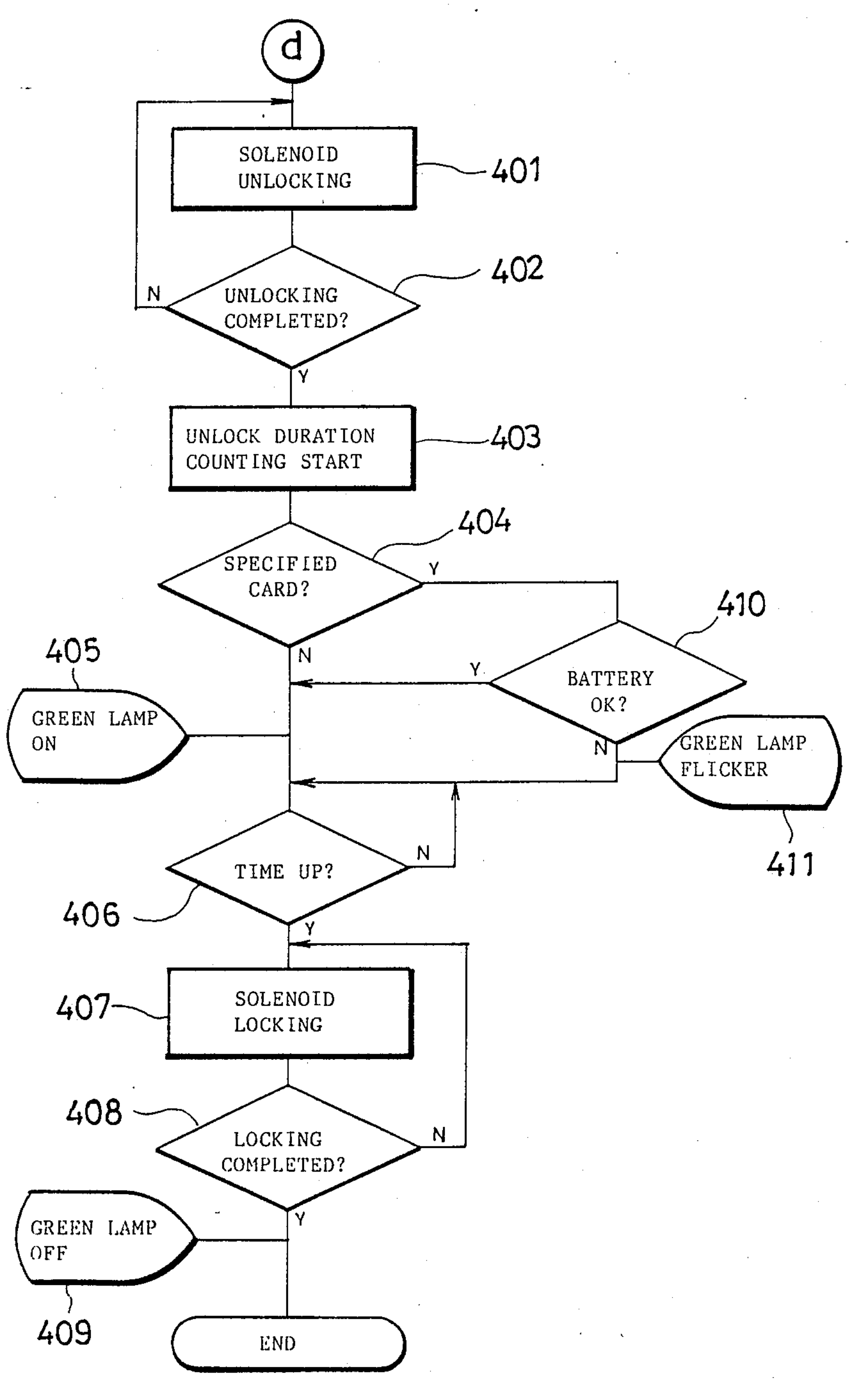
Figure 32C:
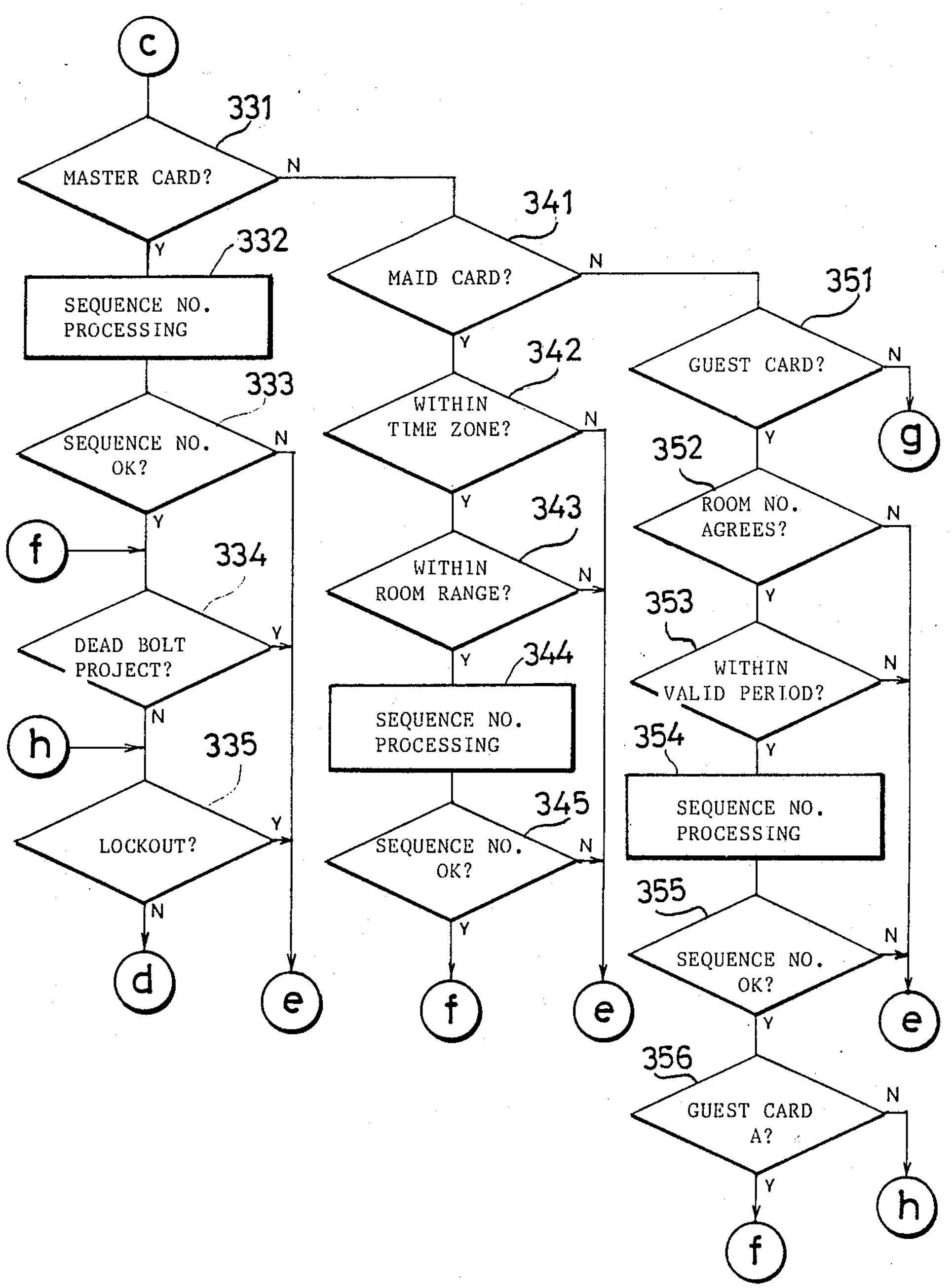
Figure 32D:
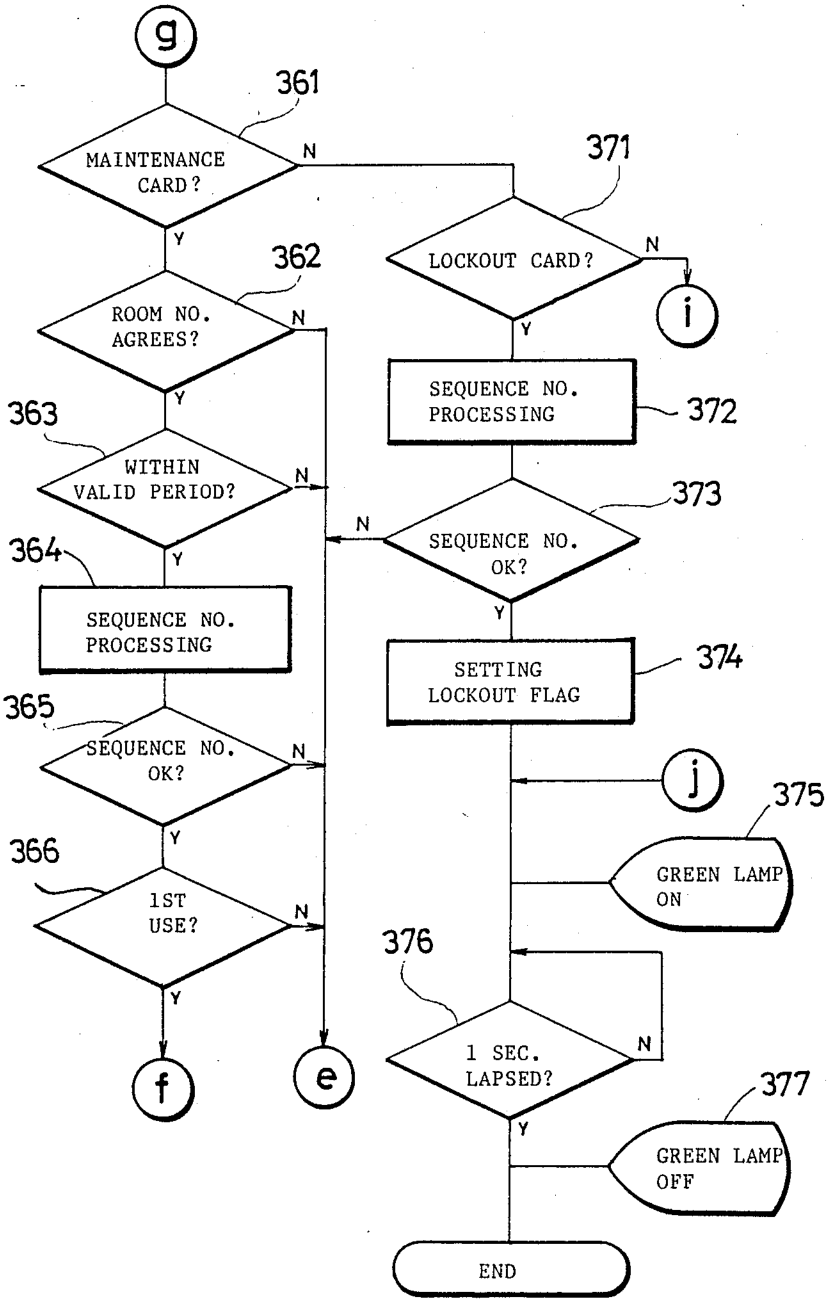
Figure 32E:
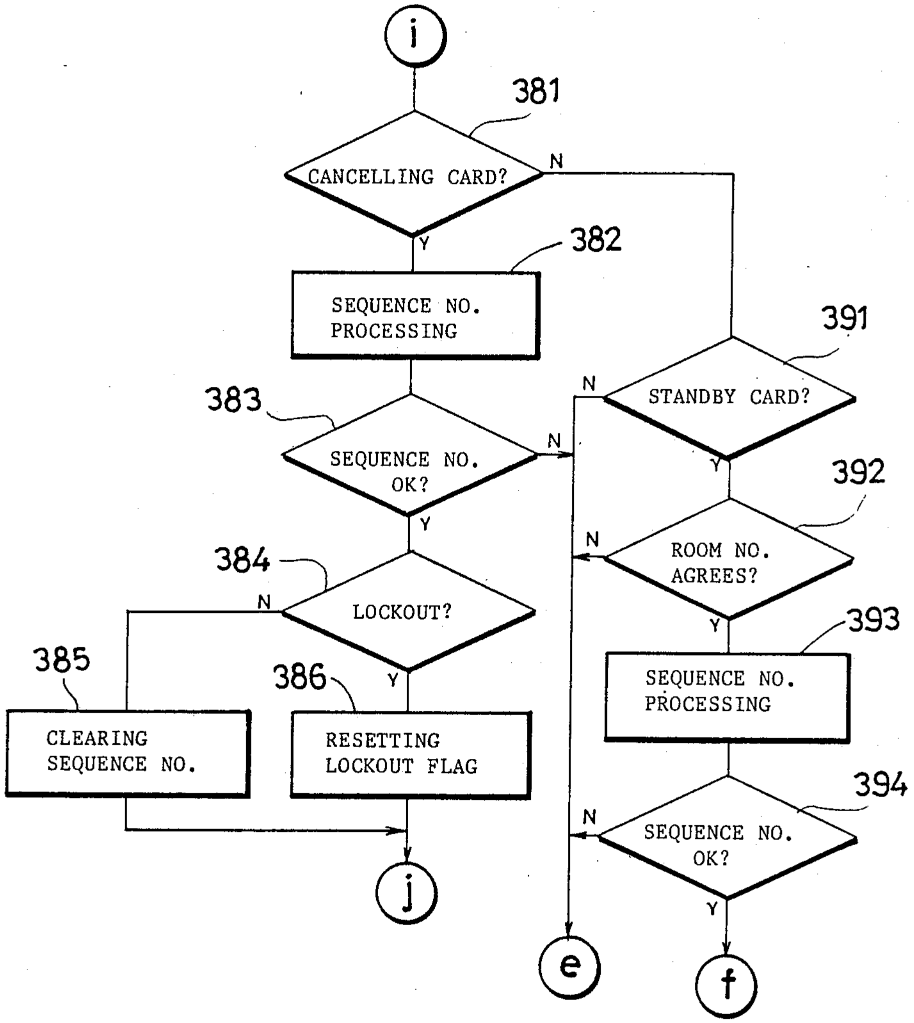

FIG. 2 shows various kinds of cards and security levels thereof;

FIG. 3 shows the items of data recorded in the different kinds of cards;

FIG. 4 is a perspective view showing the appearance of a card issuing console (parent machine);

FIG. 5 shows on an enlarged scale groups of switches on the operation panel of the card issuing console;

FIG. 6 is a block diagram showing the electrical construction of the console;

FIG. 7 shows the data stored in a RAM and ROM included in the console;

FIG. 8 schematically shows authorization card issuing and initial data setting procedures;

FIG. 9 is a flow chart showing the main routine for the console;

FIG. 10 is a flow chart showing the processing to be performed by the console with use of a GR card;

FIG. 11 is a flow chart showing the GR card issuing process to be executed by the console;

FIG. 12 is a flow chart showing the process to be executed by the console for issuing MA, SMA and GA cards;

FIG. 13 is a flow chart showing a card issuing routine for the console;

FIG. 14 is a flow chart showing the process to be executed by the console with use of the MA card;

FIG. 15 is a flow chart showing the guest card issuing process to be, executed by the console;

FIG. 16 is a flow chart showing the room cancelling process to be executed by the console;

FIG. 17 is a flow chart showing the totalling process to be executed by the console;

FIG. 18 is a flow chart showing the process to be executed by the console for issuing key cards other than guest cards;

FIG. 19 is a flow chart showing the process to be executed by the console with use of the SMA card;

FIG. 20 is a flow chart to be executed by the console with use of the GA card;

FIG. 21 shows a guest card bearing card data printed on its surface;

FIGS. 22*a*–22*b* consisting of (A)-(C), (D) and (E) show some examples of data printed out by a totalling printer;

FIG. 23 is a perspective view showing the appearance of a data input unit;

FIG. 24 is a block diagram showing the electrical construction of the data input unit;

FIG. 25 shows data stored in a memory included in the data input unit;

FIG. 26 is a perspective view showing a card lock unit attached to the door of a hotel room;

FIG. 27 is a block diagram showing the electrical construction of the card lock unit;

FIG. 28 shows data stored in a memory included in the card lock unit;

FIG. 29 is a time chart showing the operation of a solenoid included in the card lock unit;

FIGS. 30*a* and 30*b* are flow charts showing the operation of the data input unit;

FIG. 31 is a flow chart showing the data input-output process to be executed by the card issuing console with use of the data input unit; and FIGS. 32*a*–32*e* are flow charts showing the unlocking process to be executed by the card lock unit.

DESCRIPTION OF EMBODIMENTS

The present invention will be described below in detail as embodied as a hotel card lock system.

1. Outline of Hotel Card Lock System

FIG. 1 schematically shows the overall construction of the hotel card lock system. Hotels have a large number of rooms which need locking. Each of such rooms is usually provided with a mechanical lock, such as a tumbler lock, which is unlockable by rotating a key. The present hotel card lock system is adapted to electrically lock and, especially, unlock the door of the room with a card (termed a "key card KC") having given data recorded therein, for example, magnetically.

The key card KC is issued by a card issuing console 10 or 11. To issue the key card KC, authorization cards AC are necessary as will be described later in detail. Card issuing consoles include a parent machine 10 and one or a plurality of satellite machines 11 connected thereto by transmission cables. All types (to be stated later) of key cards KC can be issued by the parent machine, whereas key cards KC of the specified type only can be issued by the satellite machine. The consoles 10 and 11 have the function of storing and printing data relating to the issue of cards in addition to the function of issuing cards. The number of satellite machines 11 is dependent on the scle of the hotel to be equipped with the hotel card lock system. The parent machine 10 only may be installed in a small hotel.

A card lock unit 70 is attached to the door of the hotel room. The unit 70 includes a card reader for reading data from the key card KC. The card data is checked before unlocking. The card lock unit 70 has a battery incorporated therein and operates in off-line mode. There is no need to provide a line for supplying power to the unit 70 or a data line for connecting the unit 70 to the console 10. A data input unit 50 is used for reading from the card issuing console (parent machine) 10 the data necessary for operating the card lock unit 70 and feeding the data to the card lock unit 70

As is well known, the door is provided with a dead bolt in addition to a latch bolt. The dead bolt is manually forced outward by the guest from inside the room for locking. While there are various types of key cards KC, some are not usable for unfastening the dead bolt by the card lock unit 70.

2. Kinds of Cards and Their Security Levels

FIG. 2 shows the kinds of cards to be used for the hotel card lock system and the security levels thereof. A grand authorization card (hereinafter abbreviated as a "GR card") is the highest in security level (grand level). This card is to serve as a "key" for the overall system.

The cards of the second highest level (authorization level) are a master authorization card, sub-master authorization card and guest authorization card (hereinafter referred to briefly as "MA card," "SMA card" and "GA card," respectively). These three kinds of cards at the authorization level correspond to the authorization cards AC shown in FIG. 1.

The level for unlocking the hotel room (unlocking level) is divided into management level, guest level and maintenance level. Available at the management level are an emergency card, master card and maid card. The cards at the guest level are a standby card, guest card A and guest card B. The cards at the maintenance level are a maintenance card, lockout card and cancelling card. These nine kinds of cards at the unlocking level correspond to the key cards KC shown in FIG. 1. According to the present embodiment, the guest card A or guest card B only is used for one hotel card lock system (or for one hotel), and the two types of cards will not be issued by one system at the same time. Of the cards at the unlocking level, the standby card, guest cards A, B and maintenance card are paper cards, while all the other cards are plastics cards. Paper cards are inexpensive, suited to disposal and convenient in that the desired information can be easily printed on the surface.

The above cards are used for the purposes and have the functions briefly stated below.

GR card

The hotel code concerned is registered in the card issuing console with use of this card. The hotel code, which is recorded in every card, is very important as data for recognizing whether a particular card is one issued by the hotel concerned.

The card is used also for issuing MA, SMA and GA.

MA card

To be used for issuing the nine kinds of cards at the unlocking level.

SMA card

To be used for issuing the maid card and guest cards A and B.

GA card

To be used for issuing the guest cards A and B. Emergency card

To be used for unlocking any desired room in the event of emergency.

Every card lock unit can be unlocked by this card whether the room is locked by the dead bolt or whether the room is locked out.

Mater card

To be used as a substitute for the so-called mater key.

All card lock units can be undone by this card except for those fastened by the dead bolt.

Maid card

To be used by the maid for cleaning the room or for access to the interior for other work.

In a specified time zone, the card is used for opening the card lock units for the rooms within a specified range of room numbers, except those locked by the dead bolt. The term "specified range of room numbers" refers to the rooms assigned to the maid bearing the card for her to work in. The term "specified time, zone" refers to the period of time during which the maid is to work, e.g. from 10 to 15 o'clock. The time zone is not always provided as will be stated later.

Guest card A

This card is handed to the guest upon checking in for him to freely use (lodge in) a specified room.

The card lock unit of specified room number can be opened by the card except when it is fastened by the dead bolt. The term "specified room number" refers to the room number assigned, upon checking in, to the guest carrying the guest card A.

Guest card B

This card opens the card lock unit of the specified room number irrespective of whether it is fastened by the dead bolt.

Maintenance card

To be used by the maintenance worker for the inspection, maintenance and repair of the room.

Except where the room is locked by the dead bolt, the card lock unit with a specified room number can be opened by this card only once on the day of issue of the card. The term "specified room number" refers to the room to be maintained, inspected, repaired or otherwise worked in by the worker.

Lockout card

To be used for locking out a specified room.

When locked out by this key card, the card lock unit is no longer openable by any of the master card, maid card, guest cards A, B, maintenance card and standby card.

Cancelling card

The card lock unit, when in locked-out state, is opened by this card. When the unit is not locked out, the card clears the sequence number (to be described later) relating to a specific card and stored in the memory within the card lock unit. With the present embodiment, sequence numbers relating to the guest card and maintenance card are cleared.

Standby card

A spare card for the guest card. It is used, for example, when the card issuing console malfunctioned.

The card lock unit of a specified room number is undone by this card except when the room is locked by the dead bolt.

3. Card Data and Unlocking Method

FIG. 3 shows the data recorded in the foregoing different types of cards. Each card has a magnetic stripe affixed thereto or printed thereon. Data specific to the card type is magnetically recorded in the stripe.

The items of data common to all card types are formality codes and the hotel code. The formality codes include start of test (STX), end of text (ETX), longitudinal redundancy check (LRC), etc. The hotel code is a specific code for identifying the hotel concerned.

A classification code is an item of data which is contained in cards of any type. This code identifies the type of a particular card.

The data in the authorization cards other than the GR card, i.e. the MA, SMA and GA cards, further includes a staff code and a staff secret code. These cards are carried and used by only some of the hotel employees who are in specific positions and called a staff. The staff code specifies the staff. The staff secret code is intended for checking whether the person using an authorization card is authorized to do so. The staff secret code is a number comprising several digits. When the authorization card is to be used on the card issuing console by a staff member, he keys in his staff secret code, and the keyed-in code is checked with the staff secret code in the card data for matching.

The eight kinds of key cards other than the standby card have recorded therein a sequence number and sequence subnumber. When a key card is used on the card lock unit, these numbers serve to check whether or not the unit is to be opened by the card. These are important items of card data.

As the most typical case wherein the sequence number and sequence sub-number are required for unlocking, use of guest cards will be considered. The user (guest) of a hotel room frequently changes, and when a day elapses, another guest is very likely to use that room. A key card is issued to every guest, who need not return the card to the hotel. Accordingly, it will not be good enough if the room can be unlocked only when the sequence number on a guest card matches the sequence number stored in the memory of the card lock unit, because even after the guest at the room has changed, the previous quest will be able to unlock the room with use of his card.

To make it possible for the latest guest only to use the room, there arises the need to change the sequence number every time a new guest card is issued. Since the card lock unit operates in off-line mode, there is no means for transmitting the data of a new sequence number from the card issuing console to the card lock unit, so that the unit is unable to know the new sequence number. Japanese Patent Publication No. 59-21422 or U.S. Pat. No. 4,385,231 discloses a method of changing the sequence number upon change of guest for use in a hotel card lock system equipped with card lock units which operate in off-line mode. The method of unlocking with use of key cards according to the present embodiment is basically the same as the disclosed method.

Suppose the sequence number and sequence sub-number of the preceding key card are CN1 and SN1, respectively. The preceding sequence number CN1 is stored in the memory of the card lock unit. Further suppose the sequence number and sequence sub-number of the current key card are CN2 and SN2, respectively. Under such a circumstance, the card lock unit checks whether the current sequence number CN2 is in a definite relation with the preceding sequence number CN1 and the current sequence sub-number SN2. If it is in this relation, the unit opens. The unlocking condition is represented by the following equation, in which f is a function.

$$CN2=f(CN1, SN2)$$

If this unlocking condition is satisfied, the sequence number in the memory of the unit is renewed by the new sequence number CN2. Consequently, the sequence number on the current key card thereafter matches the sequence number stored in the memory until another new key card is issued.

When a sequence number is prepared for the first time, a desired number (e.g. random number) will be used. If no sequence number is stored in the memory of the card lock unit, the unit stores the sequence number on the card as the current sequence number and opens.

With the present embodiment, the standby card is to be collected by the hotel after the room is used, so that there is no sequence sub-number for this card.

The card data recorded on the maid card further includes a starting room number and an ending room number to show the room range, and the aforementioned time zone.

The card data on the guest cards A and B further includes a room number indicating the room to be used, card issue date (date of check-in) and check-out date, time.

The maintenance card has further magnetically recorded therein a room number indicating the room to be used and card issue date (to show the day on which the card is usable).

The standby card also contains a room number indicating the room to be used, as card data.

4. Construction of Card Issuing Console

FIG. 4 shows the appearance of the card issuing console (parent machine) 10. A totalling printer 19 is provided on the top of the console 10 at one side thereof. The console 10 is provided at its upper portion a display panel having a display 12 and a card issuing opening 13. The console lower portion has an operation panel provided with function switches 15 and a ten-key arrangement 16. An authorization card inlet 14 is formed further below these members. The display 12 shows alphanumeric characters entered by the function switches 15 and ten-key arrangement 16, and simple instructions for the procedure to be followed next, such as "INSERT CARD." Although not shown, the console 10 has, for example on its rear or lateral side, a connector 23 for the satellite machine 11 and a connector 24 for the data input unit 50 (see FIG. 6). A power switch 17 is mounted on one side of the console 10.

The card issuing console satellite machine 11 also has nearly the same appearance as the parent machine 10. However, the totalling printer 19 and the connector 23 for the data input unit 50 are not mounted on the satellite machine 11.

FIG. 5 shows the operation panel of the console 10 on an enlarged scale. The function switches 15 include five switches arranged in a horizontal row at the left side of the ten keys 16, and four switches arranged in a vertical row at the right side of the ten keys 16. The five horizontally arranged switches, which are lighted up when depressed, are used for entering "GUEST," "CANCEL (ROOM)," "TOTAL," "MONITOR (CARD)" and "OTHER FUNCTION." The four vertically aligned switches have such functions as "ENT (entry)" and "ITEM." These functions will be described later in detail. The ten-key arrangement 16 includes keys for entering the numerical values of 0 to 9, and a cancelling key "C."

FIG. 6 schematically shows the electrical construction of the card issuing console (parent machine) 10. The console 10 includes a control unit 20 comprising a central processing unit (CPU), a ROM having stored therein the program to be executed by the CPU and other fixed data, and a RAM for storing variable data. Connected to the control unit 20 through a suitable interface are the foregoing ten-key arrangement 16, function switches 15, display 12, totalling printer 11, satellite connector 23 and data input unit connector 24, and further a card reader 21 and a card reader 22 with a printer. The card reader 21 is disposed inside the card inlet 14 for reading data from the authorization card inserted into the inlet 14 and also for recording specified data in the GR card to issue the card. The printer-equipped reader 22 is used for writing specified data in all the cards other than the GR card to issue these cards, and also for printing check-out date and time, room number, etc. on paper cards including the guest card when required. The card issuing opening 13 shown in FIG. 4 is provided for this reader 22.

For issuing cards other than GR cards, a blank card for the card to be issued is inserted into the opening 13. Further the authorization card AC is inserted into the card inlet 14.

FIG. 7 chiefly shows the data stored in the memory of the control unit 20 in the card issuing console (parent machine) 10.

A marker side secret code is stored in the ROM by the maker on completion of fabrication of the console 10. This code will be stated later.

The RAM has an operation mode area, initial data area, sequence number area, room data area, issued AC registration area, totalling area, etc.

The following data is stored in the operation mode area.

Guest card A or B

As already mentioned, there are two kinds of guest cards: A and B. Guest cards of only one of these types can be issued by the console of the hotel card lock system installed in one hotel. This operation mode data represents whether the guest cards to be issued are of the A type (unable to unlock the room locked by the dead bolt) or of the B type (unlockable even when the dead bolt is in locking position).

Time zone set or not

The term "time zone" refers to the period of time for the maid to work in the room. This operation mode data represents whether the time zone is set or not. When no time zone is set, the maid is free to work in the room at any time. Thus, the card lock unit of a room within the specified range of room numbers can be opened by the maid card at any time.

Room number printing needed or not

This represents whether it is needed to print the room number on the guest card.

Number of satellite machines

This data indicates the number of satellite machines connected to the parent machine.

The foregoing four items of data are set by a dip switch (not shown) provided inside the console (parent), for example, when it is installed. These items of data thus set are read by the CPU and stored in the RAM.

At each satellite machine, a satellite machine number for identifying the machine is similarly set by a dip switch therein and is stored in the RAM.

The initial data area stores the following initial data.

Hotel code

As already stated, this is a code for specifying the hotel equipped with the hotel card lock system.

GR secret code

A confidential code for checking whether the person using the GR card is authorized to do so. The code keyed in is checked with the GR secret code stored for matching to judge whether the user is authorized.

Clock

This data represents the present time (year, month, day, hour, minute and second) and is renewed with the lapse of time by the CPU of the control unit 20.

Unlocking duration (seconds)

The period of time for the card lock unit 70 to be held open. It is set, for example, to several seconds to about 10 seconds. Details are given later.

Check-out time

As a rule, determined by the hotel.

Allowable check-out overtime (minutes)

As stated above, the check-out time is recorded in the guest card, by which the room can be unlocked only until the check-out time as a rule. The allowable time is a period of time (e.g. about 20 to about 30 minutes) during which unlocking is possible with use of the guest card even after the lapse of time.

Registered room number

A list of the numbers of the rooms available at the hotel. Generally, the room numbers of all rooms are registered.

Time zone

As already mentioned, the period of time during which the maid can work in the room. When to be set, a time zone, for example, of 10 to 15 o'clock is set. When no time zone is set, the data is set, for example, to 0 to 23:59.

The foregoing items of initial data are set by the initial data setting procedure to be described later.

The data stored in the sequence number area are the sequence numbers of issued emergency card, master card, maid card, lock-out card and cancelling card. Since there are a plurality of maids, a plurality of maid cards are issued, one to each maid. With the present embodiment, same sequence number is recorded in all maid cards. The same is true of the other cards. In the sequence number area, therefore, one sequence number only is stored for each type of card. However, different sequence numbers may be recorded in cards of the same type and stored in this area.

Data is stored for each room number in the room data area. This data includes the sequence numbers of the guest card and maintenance card issued for the room, and the check-out date and time of the guest assigned the room. Although not shown, the number of guest cards issued and other data as to the guest may be stored.

The staff codes and staff secret codes on the effective MA, SMA and GA cards already issued are registered in the issued AC registration area.

The types of cards other than the GR card and the number of issued cards of each type are stored in the totalling area. Preferably, further detailed data as to the issue of cards is stored.

5. Outline of Authorization Card Issuing and Initial Data Setting Procedures

FIG. 8 schematically shows the procedures of issuing GR card, setting initial data and issuing other authorization cards, i.e. MA, SMA and GA cards.

The whole equipment of hotel card lock system fabricated by the maker is delivered to an installing company, which installs the equipment in a hotel. Before the equipment is delivered to the installing company, the RAM of the card issuing console (parent machine) 10 is cleared, and a maker side secret code is stored in the ROM of the console 10 by a responsible person of the maker. The GR card furnished by the maker has recorded therein only a formality code and a classification code for identifying the card and is still an incomplete card. Preferably only one GR card is delivered to the installing company.

The responsible person of the maker notifies only a responsible person of the installing company of the maker side secret code. The responsible person of the installing company determines a hotel code for identifying the hotel and enters the hotel code into the console 10. It is only the responsible person of the installing company that knows the hotel code in order to assure high security.

As will be described later, the GR card is issued (completed) at the time of input of the hotel code as will be described in detail later. Stated conversely, the hotel code is keyed in when the GR card is issued (completed). The responsible person of the installing company inserts into the card inlet 14 of the console 10 the GR card delivered from the maker and keys in the maker side secret code informed from the responsible person of the maker. When the keyed-in secret code matches the secret code stored in the RAM, the input of the hotel code becomes acceptable, and the responsible person of the installing company keys in the hotel code. The keyed-in hotel code is stored in the initial data area of the RAM of the console 10 and also recorded in the GR card. The GR card is thus issued, with all the required data prepared therefor.

The console 10 having the hotel code entered and stored therein is installed in the hotel, and the completed GR card is delivered to the responsible person of the hotel. Of course, the hotel responsible person is not informed of the hotel code.

The GR card, although completed, is still unusable for issuing the other authorization cards (MA, SMA and GA cards); there is the need to key in a GR secret code. The console 10 does not operate before the input of initial data. Accordingly, the responsible person of the hotel enters initial data (inclusive of GR secret code), which is then stored in the RAM. It is only the hotel responsible person that knows the GR secret code. At this time, the foregoing operation modes are also set by the dip switch.

The other authorization cards are issued by the hotel responsible person with use of the GR card by the following procedure. The GR card is inserted into the card inlet 14 of the console 10, and the GR secret code is keyed in. Only when the keyed-in GR secret code matches the GR secret code stored in the RAM, the process for issuing the authorization cards follows. A blank card carrying no data is inserted into the card issuing opening 13, and a staff code and staff secret code are keyed in, whereupon a sequence No. is produced within the console 10. These items of data are recorded in the blank card by the printer-equipped card reader 22. In this way, MA, SMA and GA cards are issued from the opening 13.

Although the installing company is present between the maker and the hotel according to the above description, the maker is serviceable also as an installing company, in which case, the hotel code is entered into the console 10 by the maker.

6. Main Routine for Card Issuing Console and Process with GR Card

FIG. 9 shows the main routine to be executed by the card issuing console 10. When the power switch 17 on the console 10 is turned on, the display 12 shows an instruction, "INSERT AUTHORIZATION CARD." When a card inserted is detected by a card sensor (not shown) provided inside the inlet 14 (step 101), the data on the card is read by the card reader 21 (step 102). Every card, even if it is GR card before completion, bears a classification code, so that the type of card inserted is detected with reference to this code (step 103 to step 106). Since authorization cards AC only are inserted into the inlet 14, the inserted card is checked as to which of GR, MA, SMA or GA card it is, followed by a process in accordance with the card type detected (steps 113 to 116). When the process with use of each of the authorization cards has been completed as will be described in detail later, the card is withdrawn (step 107), whereby the main routine is completed.

FIG. 10 shows the process with the GR card represented by step 113 in FIG. 9. This process is practiced only by the hotel responsible person. The process includes issue of GR card, initial data setting, issue of the other authorization cards (MA, SMA and GA cards) inclusive of invalidation of such card, change of initial data and initial data printing. These procedures are carried out with the GR card inserted in the card inlet 14.

When GR card is to be issued, the GR card inserted in the card inlet 14 does not have the hotel code recorded therein. Accordingly, if the card data read in step 102 of FIG. 9 contains no hotel code, step 121 determines that a GR card issuing process (step 131) is to follow.

If the GR card date is found to contain the hotel code, step 122 checks whether initial data has already been set in the initial data area of the RAM. When the initial data has yet to be set, an initial data setting process follows (step 132).

If otherwise, the display 12 shows an instruction: "ENTER SECRET CODE," whereupon the hotel responsible person keys in a GR secret code by the ten-key arrangement 16. The keyed-in GR secret code is checked with the GR secret code stored in the RAM for matching (step 123).

When the two secret codes are found to match, the display 12 shows the instruction of "SELECT ITEM" along with some items, i.e. MA, SMA and GA card issue, initial data change and initial data printing, and item numbers representing these items. The responsible person enters the desired item number using "ITEM" switch among the function switches 15 and ten-key arrangement 16, whereupon the input is read (step 125) and the item selected is identified (steps 126 to 128). The process for the specified item then follows (steps 136 to 138).

The procedure of keying in the secret code can be repeated up to three times for correction. If the keyed-in GR secret code is not in match with the GR secret code in the RAM, the display 12 gives an indication of an error. When the key input still fails to match the stored GR secret code even after three repetitions, an alarm goes on with an indication of error given on the display 12. NO is given in response to the inquiry of step 124, and the process with GR card is completed.

The input procesure of the maker side secret code and of the staff secret code can also be repeated up to three times for correction.

7. Process for Issuing GR Card

As stated above, the GR card is issued by the responsible person of the maker or the installing company. This process includes key input of the hotel code to the parent console 10.

FIG. 11 shows the GR card issuing process of step 131 shown in FIG. 10.

In response to the instruction, "KEY IN SECRET CODE," the responsible person of the maker or the installing company enters the maker side secret code by the ten-key arrangement 16, whereupon the input code is read and checked for the maker side secret code stored in the ROM for matching (step 141). If they match (step 142), the display shows an instruction: "ENTER HOTEL CODE." The responsible person enters the hotel code by the ten-key arrangement 16, whereupon the code is read and displayed on the display 12 (step 143). The hotel code is written in the initial data area of the RAM and also in the GR card by the card reader 21 (step 144). The completed GR card is thereafter ejected from the inlet 14 (step 145). If the maker side secret code input does not match the one stored in the ROM, the GR card is ejected without any processing.

8. Process for Setting, Changing and Printing Initial Data

By the initial data setting process of step 132 in FIG. 10, all the initial data other than the hotel code already keyed in is keyed in and also registered in the initial data area of the RAM.

In the order of GR secret code, present time (clock) (year, month, day, hour, minute, second), unlocking duration (seconds), check-out time, allowable check-out overtime (minutes) and registered room number, instructions "ENTER INITIAL DATA" are shown in succession therefor on the display 12. When these items of initial data are keyed in, the input data is shown on the display 12. After these six items of initial data have been entered, "ENT" switch among the function switches 15 is depressed.

Whether the time zone is set or not is thereafter checked with reference to the data in the operation mode area. If the time zone is set, an instruction: "KEY IN TIME ZONE" is displayed. Upon input of the time zone, the data is displayed.

Finally, these input items of initial data are registered in the initial data area of the RAM. If the time zone is absent, 0:00–23:59 is registered as the time zone data as already mentioned.

The initial data changing process of step 137 in FIG. 10 changes the current time (clock), unlocking duration, check-out time, allowable check-out overtime and time zone, and adds or deletes registered room numbers.

Neither the hotel code nor the GR secret code is changeable.

Since the display 12 shows these changeable items and the item numbers representing them, the item to be changed is entered by "ITEM" switch and the ten-key arrangement 16. The data to be changed is subsequently entered, and then shown on the display 16 and registered in the initial data area of the RAM, whereby the data concerned is changed.

Of the items of data registered in the initial data area, those other than the hotel code and the GR secret code are printed by the initial data printing process of step 138 in FIG. 10, using the totalling printer 19.

9. Process for Issuing MA, SMA and GA Cards

FIG. 12 shows the process of step 136, FIG. 10 for issuing MA, SMA and GA cards. This process includes, in addition of the issue of these authorization cards, invalidation of such cards and re-registration of card data.

The display 12 shows the instruction of "SELECT ITEM" and the item numbers representing card issue, invalidation and re-registration. The hotel responsible person keys in the desired item by "ITEM" switch among the switches 15 and the ten-key arrangement 16 (step 151).

If the issue of card is selected (step 152), the display gives an instruction: "ENTER NUMBER OF CARDS," so that the number of cards to be issued is entered for each of MA card, SMA card and GA card (step 153). The number of cards of course includes zero.

First, the procedure of issuing MA cards is performed. The display 12 gives the instruction of "ENTER STAFF CODE AND STAFF SECRET CODE." Step 154 keys in these codes. As already stated, the formality code, hotel code, classification code, staff code and staff secret code are recorded in the MA card. The formality code and the hotel code are predetermined; the hotel code has already been registered in the initial data area of the RAM, and the staff code and the staff secret code have been keyed in. With all card data thus prepared, a card issuing routine follows.

FIG. 13 shows this routine. The hotel responsible person inserts a blank card into the card issuing opening 13, whereupon the card is detected by the unillustrated card sensor disposed inside the opening 13 (step 171). The card data is encoded by the reader component of the printer equipped card reader 22 on the plastics card inserted (step 172).

Since the card to be issued is an MA card and is not a guest card or maintenance card, the sequence skips steps 173 to 177 and advances to step 178, in which the data bearing MA card is ejected from the opening 13. The card issue record is printed out by the totalling printer 19 (step 179). FIG. 22 (A) shows an example of MA card issue record printed. The print includes the type of card issued, date and time of issue of the card, and the staff code on the MA card. The card issued is thereafter withdrawn, whereby the card issuing routine is completed (step 180).

Because a specified number of cards are issued one by one, step 154 follows again if the number of cards (entered in step 153) have not been completely issued.

When the predetermined number of MA cards have been issued, the sequence proceeds to steps 157 to 159 to issue SMA cards. The same issuing procedure as above is performed for the SMA cards. Furthermore, a specified number of GA cards are issued similarly (steps 160 to 162).

When the MA, SMA and GA cards have been issued, the staff and staff secret codes on these issued cards are registered in the issued AC registration area of the RAM. The types and numbers of cards issued are stored in the totalling area.

If card invalidation or re-registration is selected in step 151 instead of card issue, the procedure therefor is followed. Although not shown, the card invalidation procedure and the card re-registration procedure are briefly stated below.

The card invalidation procedure is performed to delete the staff code and staff secret code on a specified card from the issued AC registration area. The procedure is performed when an AC card other than the GR card is lost, or when a hotel staff member carrying such a card retires from the hotel, in order to prevent unauthorized operation of the console with use of the AC card by an unauthorized person.

The card invalidation procedure can be executed using the card t be invalidated, or manipulating keys without using the card. The display gives an instruction to insert the card or to key in the staff code. Upon the insertion of the card to be invalidated into the card issuing opening 13, the data is read. If the card is an effective AC card, the staff code and staff secret code relating to the card are deleted from the issued AC registration area of the RAM. Also when the staff code is keyed in, the staff code and the corresponding staff secret code are deleted from the same registration area.

The re-registration procedure is performed when data disappears from the RAM of the parent console 10 for one cause or another. In such a case, the data for the issued AC registration area and sequence number area is read from the card data and stored in the RAM. Accordingly, used for this procedure are the MA, SMA and GA cards, emergency card, master card, maid card, lock-out card and cancelling card which are already issued. In accordance with the instructions and order given on the display 12, these cards are inserted in the card issuing opening 13, and the card data is read by the card reader. For each card type, the staff code and staff secret code or sequence number in the card data is registered in the issued AC registration area or sequence number area.

10. Process with MA Card

FIG. 14 shows the process with MA card of step 114 in the main routine for the console shown in FIG. 9. During this process, the MA card is held inserted in the card inlet 14 of the card issuing console. The process is executed only by the staff carrying the MA card.

First, the staff secret code specific to the bearer of the MA card is keyed in by the ten-key arrangement 16. The keyed-in staff secret code is checked with the staff secret code recorded in the MA card for matching (step 181). The card is also checked as to whether it is the MA card registered in the issued AC registration area of the RAM. Only when acceptable check results are obtained, the next step 182 follows.

In response to the instruction of "SELECT FUNCTION" on the display 12, the staff member depresses the desired one of "GUEST," "CANCEL (ROOM)," "TOTAL," "MONITOR (CARD)" and "OTHER FUNCTION" among the function switches 15. A switch input signal is obtained (step 183).

The input signal is analyzed to detect which switch was depressed (steps 184 to 188). When one of the first four switches was depressed, the process corresponding to the switch is performed. The processes specified by these switches are a guest card issuing process, room cancelling process, totalling process and card data monitoring process (steps 194 to 197).

If the function switch of "OTHER FUNCTION" is depressed, the display 12 shows the instruction of "SELECT ITEM," other items, i.e. issuing key cards other than the guest card and data input/output process with the data input unit, and item numbers representing these items. When the desired item number is entered according to the instruction, the desired process follows (steps 190, 191, 198 and 199).

Of the foregoing processes, those which can be executed by the satellite console 11 are the guest card issuing process, room cancelling process and card data monitoring process only. For these processes, the satellite machine 11 may have access to the room data area in the RAM of the parent machine 10 through communication with the machine 10, or the satellite machine 11 itself may be adapted to have a data area storing the same data as the room data area of the parent machine 10.

11. Process for Issuing Guest Card

FIG. 15 shows the guest card issuing process of step 194 in FIG. 14.

The display 12 gives an instruction: "KEY IN ROOM NO.,CHECK-OUT MONTH, DAY, HOUR, AND NO. OF CARDS TO BE ISSUED." The staff member enters these items of data with the ten-key arrangement 16, whereupon the data is shown on the display 12 and accepted step 201). The room number is of course the number of the room assigned to the guest. An unoccupied room can be easily recognized from the print of room vacancy list to be stated later. The check-out month, day, hour is of course the check-out time desired by the guest. Unless requested by the guest, the time predetermined by the hotel is used as the check-out time. The predetermined check-out time, which is stored in the initial data area of the RAM, need not always be keyed in. In the case where one room is to be used by a family or group, a plurality of (e.g. up to nine) identical guest cards can be issued for more than one guest.

When the data needed for issuing the guest card has been entered, the sequence proceeds to the card issuing routine (step 202) which has already been described with reference to FIG. 13.

A blank paper card is inserted into the card issuing opening 13 (step 171), whereupon card data is encoded on the magnetic stripe of the paper card (step 172). The guest card data includes a formality code, hotel code, classification code, sequence number, room number, card issuing date, check-out time and sequence sub-number. Of these items, the formality code and hotel code are already determined. The classification data represents guest card A or B. Which type of guest card is to be issued is dependent on the data in the operation mode area of the RAM. The sequence number is prepared from the preceding sequence number for the corresponding room in the room data area of the RAM and the current sequence sub-number which is determined from a suitable equation or for which a random number is used. If there is no preceding sequence number as when the room is to be used for the first time, an optional number is used as the current sequence number. The check-out time and room number used are those keyed in. The card issuing date is read from the clock in the initial data area of the RAM.

Since a guest card is to be issued, need of print on the card is determined with reference to the data of "room number printing needed or not" in the operation mode area of the RAM (steps 173 and 174). When printing is needed, the specified data is printed on the surface of the guest card by the printer component of the printer-equipped card reader 22 (step 175). FIG. 21 shows an example of printed guest card. It is seen that the room number, check-out month, day, hour and issuance No./-total No. of issued cards are printed. In place of the check-out month, day, hour, check-in date and the length of stay (days) may be printed.

Upon completion of the guest card, the card is ejected (step 178). As seen in FIG. 22 (B), the totalling printer then prints out the issuance of the card (guest card), issue number/total number of issued cards, identification of the authorization card used for issue (MA), staff code of one who issued, room number, check-in date and time, and check-out date and time (step 179).

Referring to FIG. 15 again, the foregoing process is repeatedly executed until the keyed-in number of guest cards to be issued are completely issued (step 203).

When the guest cards have been issued, the data as to the issued cards, such as sequence number and check-out date and time, is stored in the room data area of the RAM at the location for the corresponding room number.

12. Room Cancelling Process

FIG. 16 shows the room cancelling process of step 195 in FIG. 14. This process includes the procedure of cancelling a room before operating the card lock unit with a guest card issued, the procedure of extending or shortening the length of stay (check-out change), and procedure of reissuing the same guest card when the guest card is lost.

The display 12 shows an instruction to select the desired item and item numbers representing room cancel, check-out change and card reissue. One of the item numbers is therefore selected by "ITEM" switch and the ten-key arrangement 16, and the selected item is detected (steps 201 to 204).

The room cancelling process can be executed by using the guest card or by key input only. When this process is selected, the display 12 gives an instruction to insert the card or give a key input. The guest card, when inserted into the card opening 13 (step 205), is read (step 206) and checked as to whether it is valid (step 207) with reference to the hotel code, classification code, check-out time and like data. If the room number is keyed in without insertion of the card, the number is read (step 208). When the card is valid or when the room number input is given, the room number in the card data or the input room number is used for searching the room data area of the RAM, and the data, such as sequence number and check-out time, which is stored in the storage location for the room number concerned is restored to the previous state before the guest card was issued (step 209). Preferably for this process, the previous room data may be stored in the room data area. However, the preceding sequence number can be obtained from the current sequence number with use of the sequence sub-number, and the check-out time data can be deleted, so that it is not always necessary to store the previou room data. Subsequently, the staff code of the cancelling staff member, the AC card used, room number cancelled, cancelling date and time, etc. are printed out by the totalling printer 19 as a record of the cancellation made. Where possible, it is preferable to execute the room cancelling process with use of the guest card, which is subsequently collected.

The check-out change process is carried out when the issued guest card is used on the card lock unit 70 at least once. The process is executed with use of the guest card only.

The guest card, when inserted into the opening 13, is read (step 211) and checked for validity (step 212). If it is a valid card, the display 12 shows the room number and an instruction to enter renewed check-out month, day, time and the number of cards to be issued, whereupon these items of data are entered (step 213). A new guest card is issued based on the new data (step 214). A new sequence number is prepared in this card issuing routine. Although not shown, this routine is repeated for the specified number of cards to be issued (step 214).

For the reissue of card, the room number and the number of cards to be issued are keyed in (step 215), and a new guest card is issued for the room number concerned with reference to the data, such as check-out time, stored in the location of the RAM room data area for the room number (step 216). In this card issuing routine also, a new sequence number is prepared, and such data is encoded in the card to be issued and stored in the specified location in the room data area. The routine is repeated also for the number of cards to be issued.

The new card thus issued needs to be used immediately for unlocking the corresponding room at least once to renew the sequence number in the card lock unit 70.

When a new card is issed for check-out change or by reissue, the data as to the new card is printed out by the totalling printer 19.

13. Totalling Process

FIG. 17 shows the totalling process of step 196 in FIG. 14. This process includes the issue record procedure of printing out the types and numbers of issued cards stored in the RAM totalling area, the room vacancy list printing procedure of preparing a list of guest card unissued rooms with reference to the data stored in the room data area, and the room status list procedure of giving an output as to the state of all rooms with reference to the data stored in the room data area. These procedures are also selectable with use of item numbers in accordance with the information given on the display 12 (steps 221 to 224).

The issue record procedure is divided into the procedure of merely printing out the data in the totalling area, and the procedure of printing out such data and clearing the totalling area. The clearing procedure is performed with use of the MA card only.

When the issue record procedure is selected (step 222), the AC card inserted in the inlet 14 is checked as to whether the card is MA card or other card (SMA or GA card) by step 225. If it is MA card, the display shows an instruction to select one of the above two divided procedures. The staff member selects one of them to give an input (steps 226 and 227).

When the procedure including clearing of the totalling area is selected, the types and numbers of all issued cards other than the GR card, the periods of issue of these cards and the fact that the area has been cleared are printed out by the totalling printer 19, with the clearing of the totalling area (step 228). If the card inserted is not MA card, and also when the clearing including procedure is not selected, the totalling printer 19 prints out the types and numbers of the issued cards and the periods of issue of these cards. This step is illustrated as step 229 in FIG. 17.

When the room vacancy list printing procedure is selected, the vacant rooms (those with elapsed check-out time) are searched for from the room data area, a list of the room numbers concerned is prepared, and the list and the current time are printed out by the printer (step 231).

When the room status list printing procedure is selected, the room numbers and check-out time of all rooms are read out from the room data area, and the data and an indication of the current time are printed out (step 232). Preferably, the check-out time is not printed out if the check-out time has already been elapsed with respect to the current time.

It is possible to compare the clock data in the initial data area with the check-out time in the room data area at a given time interval to eliminate the check-out time data which belongs to the past with respect to the current time. Such a routine, if provided, eliminates the need to compare the check-out time with the current time and to determine whether the data is to be printed in the printing steps 231 and 232.

14. Process for Monitoring Card Data

The card data monitoring process (step 197 in FIG. 14) reads data from a card to show those of the data items which are desirable to provide as visible information on the display 12. This process is useful for discriminating card types or for recognizing card data when so required. Card data can be monitored for all of the 13 types of cards stated including GR card.

The instruction of "INSERT CARD" is shown on the display 12. When a card is inserted into the opening 13, data is read from the magnetic stripe thereon. The following data is shown on the display 12 for each type of card.

GR card

Identification of this card only.

MA, SMA and GA cards

Identification of the card, and staff code.

Emergency, master, lock-out and cancelling cards

Identification of the card only.

Maid card

Identification of the card, and the room range (starting room number to ending room number).

Guest card A or B

Identification of the card, date of issue and check-out day and time.

Maintenance card

Identification of the card, room number and date of issue.

Standby card

Identification of the card and room number.

15. Process for Issuing Key Cards Other Than Guest Cards

FIG. 18 shows a process for issuing seven types of key cards at the unlocking level other than the guest cards, i.e. step 198 in FIG. 14.

The display 12 shows the instruction of "SELECT ITEM," seven card types and corresponding item numbers. In accordance with the display, the staff member enters the desired type of card to be issued, using "ITEM" key and ten-key arrangement 16 (step 241). The data representing the input item is read, followed by the corresponding card issuing procedure (steps 242 to 248).

When emergency card is selected for issue, the display 12 shows: "ENTER NUMBER OF CARDS TO BE ISSUED," whereupon the desired number (e.g. up to 9) is entered by the ten-key arrangement 16 (step 252), followed by a card issuing routine (step 259), which is shown in FIG. 13. The data to be recorded in the emergency card includes a sequence number and sequence sub-number. These numbers are prepared from the preceding one if it is stored in the RAM sequence number area, or from random number or the like if otherwise. The new sequence number is registered in the sequence number area. After the card has been issued, the printer 19 prints out the instance of issue of emergency card, the type of card AC used therefor, staff code of the issuing staff member and issue date and time as shown in FIG. 22(*c*). The card issuing routine is repeated for the input number of cards to be issed.

Master card, lock-out card and cancelling cards are issued by exactly the same procedure as the emergency card (steps 253, 256, 257 and 259).

When maid cards are to be issued, the number of cards to be issued and the room range (starting room number and ending room number) are keyed in (step 254), followed by a card issuing routine (step 259). The data specifically required for issuing the maid card is time zone. This data is already stored in the initial data area, so that the stored data is used. Generally, the sequence number is prepared with use of the preceding one. The new sequence number is recorded in the card to be issued and is registered in the RAM sequence number area. FIG. 22 (D) shows an example of card issue record printed out by the totalling printer 19 after the issue.

When a maintenance card is to be issued, the room number only is keyed in (step 255). Since only one maintenance card can be issued for each room, there is no need to key in the number of cards to be issued. In the card issuing routine (FIG. 13, step 259), the current sequence number to be recorded in the card is prepared with use of the preceding sequence number stored in the location of the room data area for the corresponding room number. The new sequence number is stored in this location, whereby the sequence number in the RAM is also renewed. As is the case with the guest card (when printing is needed), the room number and card issue date are printed by the printer of the printer-equipped reader 22 on the surface of the maintenance card to be issued (steps 176 and 177 in FIG. 13). FIG. 22 (E) shows an example card issue record which is printed by the totalling printer for the issue of maintenance card.

The standby card issuing procedure is also nearly the same as in the case of the maintenance card (steps 258 and 259). As a rule, one standby card is issued for one room. However, the standby card does not require the same sequence numbers as required for other key cards; a standby sequence number is prepared by a method (for example, using a calculation equation including the date of issue as a parameter) and is recorded in the standby card to be issued. Since the method of preparing the standby sequence number is also programmed in the card lock unit 70, the unit can also check whether the number is a proper one. The room number, etc., although not printed on the standby card (corresponding to steps 176 and 177 in FIG. 13), may be printed.

On completion of issue of such key cards, the types and numbers of cards issed are stored in the totalling area of the RAM.

16. Processes with SMA Card and MA Card

FIG. 19 shows the process to be executed by the console with use of SMA card. In this diagram, the steps having the same function as the corresponding ones in the process with use of the MA card are each given the same reference number. With use of SMA card, it is possible to execute a guest card issuing procedure (step 194), room cancelling procedure (step 195), totalling procedure (step 196), card data monitoring procedure (step 197) and maid card issuing procedure (step 263). The first four procedures are the same as those already stated.

The staff member depresses "OTHER FUNCTION" switch among the function switches (step 188), whereupon the display 12 shows the instruction of "SELECT ISSUE OF MAID CARD" and the relevant item number, and the staff member enters this number by the ten-key arrangement 16 (steps 261 and 262). This is followed by the maid card issuing procedure (step 263), which is the same as steps 254 and 259 in FIG. 18. The procedures to be executed with use of the GA card are limited to issue of guest card, room cancelling, totalling and card monitoring. Throughout FIGS. 14, 19 and 20, like procedures or processes are referred to by like reference numerals.

When either SMA or GA card is used, the staff secret code on the card is checked with the keyed-in staff secret code for matching, and the staff code and staff secret code on the card are checked with those registered in the issued AC registration area of the RAM for matching. This serves to check whether the bearer of the card is authorized and also whether the card is valid (steps 181 and 182), whereby the guest card issuing and other process can be executed with high security.

17. Construction of Data Input Unit

FIG. 23 shows the appearance of the data input unit 50, which is made compact and convenient to carry. A reduced number of keys are provided for the ease of manipulation. Provided on the upper side of the unit 50 are a small display 51, keyboard 52 and power switch 53. A battery (indicated at 63 in FIG. 24) is incorporated in the unit 50. A connector 54 for connection to the parent console 10 or to the card lock unit 70 is attached to the free end of a cable extending outward from the unit 50. The cable includes a data bus and a power line. The keyboard 52 includes ten keys 61 and function keys 62 (see FIG. 24).

FIG. 24 shows the electric construction of the data input unit 50. A control unit 60 comprises a microprocessor MPU and a memory and is connected to the ten-key arrangement 61, function keys 62 (keyboard 52), display 51 and connector 54.

The battery supplies operating power to the unit 50.

FIG. 25 shows the data stored in the memory of the control unit 60. The memory has an initial data area, room number area, and initial data set room number registration area. The initial data forwarded from the console 10 is stored in the initial data area, the data including the hotel code, clock (year, month, day, hour, minute, second), unlocking duration (seconds) and allowable check-out overtime (minutes). The clock data is renewed by the MPU of the unit 60 with the lapse of time. The room number entered by the ten-key arrangement 61 is stored in the room number area. The initial data forwarded from the console 10 and the room number keyed in are written in the memory of the card lock unit 70 corresponding to the room number by the data input unit 50 as its main function. This process will be termed initial data setting process. The room number for which such process has been completed is chiefly stored in the initial data set room number registration area. This area also stores data indicating that other process (such as the sequence number clearing process to be stated later) has been completed.

The operation modes of the unit 50 will be described briefly. These modes are set by A to D keys among the function keys.

Initial data setting mode (D)

The unit 50 receives initial data from the console and writes the initial data and room number in the card lock unit. Performed in this mode are receipt of the initial data from the console (initial data input, D-01), supply of the initial data and room number to a card lock unit (initial data output, D-02), and report of initial data set room number to the console (room number printing, D-03). The character D means that the unit is set for the process by D key, and 01, 02, 03 mean that the ten-key arrangement is used for setting. For example, the initial data output process is set by depressing D key and then 0 key and 2 key of the arrangement.

Reading mode (A)

The data stored in the memory of the card lock unit is read and displayed on the display 51. This mode is set by the function key "A".

Writing mode (B)

Specified data stored in the memory of the card lock unit is changed. This mode is set by the function key "B".

Clearing mode (C)

All sequence numbers or specified sequence numbers stored in the memories of card lock units are cleared. This mode is set by the function key "C".

Backup mode

The power of the battery 63 in the data input unit 50 is supplied to the card lock unit 70. This mode is available whenever the connector 54 of the unit 50 is connected to a connector 83 (see FIG. 27) of the card lock unit 70.

The backup mode serves to prevent the data in the memory of the card lock unit 70 from disappearing while the battery 88 (see FIG. 27) therefor is replaced.

18. Construction of Card Lock Unit

FIG. 26 shows the apperance of the card lock unit 70 as attached to the door 80 of a hotel room, and FIG. 27 shows the electrical construction of the unit 70.

With reference to FIG. 26, a dead bolt 71 and a latch bolt 72 are provided for locking the door 80. By a small knob (not shown) on the inner side of the door 80, the dead bolt 71 is mechanically moved to an advanced position indicated in a broken line. This position is the dead bolt locking position. The dead bolt 71 is of course mechanically movable to a retracted position by the small knob for unlocking. While the dead bolt 71 is in locking position, it is electrically brought to the unlocking position only by a specified key card as will be described later. The dead bolt 71 as located in the locking position is detected by a dead bolt sensor 87 (see FIG. 27).

The latch bolt 72 is coupled to an outer knob 75 and to an inner knob (not shown), and these are driven only by a solenoid 85 incorporated in the card lock unit 70 (see FIG. 27). The solenoid 85 assumes two stationary positions: one is the locking position and the other is the unlocking position. For example, when positive voltage is applied to one input terminal of the solenoid 85, with negative voltage applied to the other input terminal, the unit 70 is opened, whereas when the voltages are applied in reverse relation, the unit is fastened. As will be stated later, the solenoid 85 is operated according the result obtained by checking the key card for validity. When the unit 70 is undone, the latch bolt 72 is movable to the retracted position by manually turning the outer knob 75 or inner knob. When the unit 70 is in the locking position, these knobs are not rotatable, and the latch bolt 72 is held in its advanced position. A guard bolt 73 is movable with the latch bolt 72. When the unit is electrically undone by a key card, the dead bolt 71 is also brought to its retracted position by the solenoid 85. The solenoid 85 as located in one of the two stationary positions is detected by a solenoid sensor 86 (see FIG. 27). The card lock unit 70 is automatically brought to the locking state when the door 80 is closed.

On the outer side of the door 80, there is a key card scanning groove 74, which is provided with a green pilot lamp 76 and a red pilot lamp 77 on its opposite sides. The green pilot lamp 76 goes on chiefly when the unit 70 is in the unlocking position. The lamp 76 is used also for indicating the result of checking of a battery 88 (see FIG. 27). The red pilot lamp 77 goes on when the key card is found to be not effective for unlocking.

A card reader 82 (see FIG. 27) is provided inside the scanning groove 74. Although not shown in FIG. 26, the unit 70 has a connector 83 connectable to the connector 54 of the data input unit 50. As seen in FIG. 27, the unit 70 has incorporated therein a control circuit 81, battery 88, battery check circuit 89, the above-mentioned solenoid 85, drive circuit 84 therefor and sensors 86 and 87.

With reference to FIG. 27, the control circuit 81 includes a microprocessor MPU and a memory. Connected to the control circuit 81 are the card reader 82, pilot lamps 76, 77, connector 83, solenoid 85, solenoid drive circuit 84, sensors 86, 87 and battery check circuit 89. These circuits are operated by the power supplied from the battery 88. The battery check circuit 89, which can be a known one, is used for checking whether the output voltage of the battery 88 has dropped to a predetermined level or lower. The term "predetermined level" means a voltage not higher than the normal voltage to be supplied to the card lock unit 70. Of course, the level is determined with some allowance.

FIG. 28 shows part of the memory of the control circuit 81. The memory has the unlocking program to be stated later, and further includes areas for storing the illustrated data. The main data to be stored in the memory are initial data, room number, data read from key card and sequence number. The initial data includes the hotel code, clock, unlocking duration and allowable check-out overtime. These items of data are delivered from the data input unit 50. The clock data is renewed by the MPU with the lapse of time. The room number is the number of the room equipped with the card lock unit and is fed from the unit 50. Stored as the sequence number is that of one of the eight types of key cards at the unlocking level (guest card A or B). The memory further has areas for use as a lockout flag and a flag indicating that the maintenance card has already been used.

FIG. 29 shows the usual operation of the solenoid 85, which is usually in a locking state. When the key card is checked for validity and found effective for unlocking, the solenoid 85 is energized, whereupon the solenoid changes from the locking state to unlocking state. The duration of energization is about 100 msec. Upon lapse of a predetermined period of unlocking, current is now passed through the solenoid 85 in the opposite direction, bringing the solenoid 85 into the locking state again. Accordingly, one who is to enter the room must enter during the unlocking duration. Upon the lapse of the unlocking period, the unit 70 moves into the locking state, so that the key card needs to be scanned once again. The term "unlocking period or duration" means the period of time during which the card lock unit is held open by the use of the key card and which is set to several seconds to about 10 seconds (initially set by the console).

19. Initial Data Input/Output Process with Data Input Unit

FIG. 30 shows the operation of the data input unit 50, especially the processing procedure to be performed by the MPU. FIG. 31 shows the data input/output process (step 199 in FIG. 14) to be executed by the console 10 with use of the unit 50.

First, the initial data setting process will be described in which initial data is forwarded from the console 10 to the data input unit 50, and the initial data and room number are fed from the data input unit 50 to the card lock unit 70 of each room. This process is performed when the card lock unit is installed for each room or is replaced, or when the initial data is entirely changed.

The staff member bearing MA card connects the connector 54 of the data input unit 50 to the connector 24 of the parent console 10, whereby the control unit 60 of the data input unit 50 is connected to the control unit 20 of the console 10 through a bus line. The staff member turns on the power switch 53 of the unit 50.

Next, according to the process procedure shown in FIG. 14, the staff member keys in at the console 10 the item number for input/output process with use of the data input unit, whereupon the sequence changes from step 199 of FIG. 14 to the routine of FIG. 31. The display 12 of the console 10 shows an instruction to select either the transfer of initial data to the data input unit or reading of data from the data input unit. The staff selects the transfer of initial data (from step 301 to step 302 in FIG. 31). With use of the function key "D" and "0" and "1" keys of the data input unit 50, the staff member sets initial data input process in the initial data setting mode (connector checking in step 271 in FIG. 30, followed by steps 272 and 273).

With the card issuing console 10, the hotel code, clock, unlocking duration and allowable check-out overtime are read from among data items stored in the RAM, and these items are transferred to the data input unit 50 (step 303 in FIG. 31). The initial data transferred to the unit 50 is stored in the initial data area of its memory (FIG. 30, step 274). This is effected, for example, by DMA transfer. The display 51 further shows that data setting is completed. This means that the initial data has been delivered from the console 10 to the data input unit 50. The staff member turns off the power supply for the unit 50 and disconnects the unit 50 from the console 10.

The staff member carries the data input unit 50 to the front of the door of the hotel room. He connects the connector 54 of the unit 50 to the connector 83 of the card lock unit 70 mounted on the door and turns on the power switch 53, whereby the lock unit 70 is connected to the unit 50 through a bus line. Subsequently the staff member sets an initial data output process in the initial data setting mode, using "D", "0" and "2" keys. (The sequence proceeds to steps 271, 272, 273 to 275.) Using the ten-key arrangement, the staff member further keys in the room number of the room, and the input data is accepted (step 276). The initial data stored in the memory of the data input unit 50 is transferred to the unit 70 and stored in the memory thereof along with the room number. To accomplish this, the memory of the card lock unit 70 is directly accessible by the MPU of the data input unit 50. The room number is further stored in the initial data set room number registration area of the memory of the unit 50. The display 51 shows completion of data setting, whereupon the staff member turns off the power supply of the unit 50 and disconnects the unit 50 from the unit 70.

The staff member repeats such initial data output process for the card lock unit of each hotel room in succession. When this process is completed for all rooms, or when the initial data set room number registration area of the unit 50 is filled up, he returns to the location where the console 10 is installed, and performs printing.

The staff member connects the data input unit 50 to the console 10 again, and turns on the power supply for the unit 50. With the console 10, the staff member selects the data reading item from the data input/output process with use of the data input unit. (The sequence proceeds from FIG. 14 to FIG. 31, steps 301, 303 to 304.) He sets the unit 50 for room number printing process, using "D", "0" and "0" keys (FIG. 30, steps 271, 272, 273, 275 to 278).

When the above setting has been completed, the room number data is read out from the initial data set room number registration area of the unit 50 (FIG. 30, step 279) and transferred to the console 10. A list of the input room numbers is printed by the totalling printer 19 of the console 10 (FIG. 31, step 305).

20. Other Operation of Data Input Unit

When the data input unit 50 is in the reading mode, all items of data, i.e. initial data, room number, card read data and sequence number, stored in the memory of the unit 70 are read out. Of these items, the data of the items specified by the ten-key arrangement are shown on the display 51. However, the hotel code which is confidential is not shown. As to the hotel code, the code read out from the card lock unit 70 is checked with the one stored in the unit 50 for matching, and the result, i.e. OK or NG, is shown on the display. The reading mode process is executed to check the data when the unit 70 malfunctioned or to periodically check the data in the unit 70. The item numbers of the data to be displayed is given for example in a manual.

The staff member connects the data input unit 50 to the card lock unit 70 to be checked by this process, and turns on the powere switfh 53. Further the reading mode is set by the function key "A" (FIG. 30, steps 271, 272 to 281), whereupon the card lock unit memory is accessed by the MPU of the data input unit 50, and the above data stored is all fetched to the unit 50 and stored in the memory thereof (step 282). When the item number of the data to be displayed is entered by keying in, the data is shown on the display 51. When there are a plurality of such data items, the item numbers are keyed in successively, and the data concerned is shown for every input.

Finally, the power switch of the unit 50 is turned off, and the unit 50 is disconnected from the unit 70.

The writing mode is so adapted that of the data stored in the unit 70, the room number, clock, unlocking duration and allowable check-out overtime are changed with use of the data input unit 50. Of these items of data, the item to be changed is entered by the ten-key arrangement. The process is used for correcting the clock of the unit 70 and modifying the conditions for using the room.

The writing mode is set when the function key "B" is depressed with the input unit 50 connected to the lock unit 70 (FIG. 30, steps 271, 272, 281 to 285). Subsequently, the data item to be changed is entered by the ten-key arrangement (step 286), and the data to be changed is similarly entered (step 287). The data input is stored in the location concerned in the memory of the lock unit 70 (step 288).

The clearing mode process is used for deleting all or some of the sequence numbers for the eight types of key cards stored in the lock unit memory. This process is executed when an error or disturbance occurs in sequence numbers. An instruction as to whether all sequence numbers are to be deleted, or the sequence number of which key card is to be cleared is given by entering the item number concerned by the ten-key arrangement.

The clearing mode is set by the function key "C" with the input unit 50 connected to the lock unit 50 (FIG. 30, steps 271, 272, 281, 285 to 291). When the key card item whose sequence number is to be cleared is entered by the ten-key arrangement (step 292), the sequence number is deleted from the lock unit memory (step 293).

21. Unlocking Process in Card Lock Unit (1) Kinds of Key Card Validity Checks The guest or other person who is to open the lock unit 70 passes his key card through the card scanning groove 74 for scanning, whereby the card data is read by the card reader 82, and a series of specified checks are performed for the card data. When the card is found acceptable by these checks, the solenoid 85 is energized for unlocking. These checks are called key card validity checks and are of the following kinds. All the following checks are not always performed for every type of key card; the combination of checks differs with the type of key card.

Parity check

The parity check includes a vertical parity check and horizontal parity check. If the card data is found not acceptable by at least one of these checks, the card is judged as being invalid, failing to open the lock unit 70. These checks are conducted for the data of every type of key card.

Format check

The card data form is checked as to whether it is in conformity with the specified format. When it is out of conformity with the format, the key card is judged as being invalid. This check is conducted also for every type of key card.

Hotel code check

The hotel code in the card data is checked with the hotel code stored in the lock unit memory for matching. When the two codes do not match, the key card is found to be invalid. This check is conducted also for every type of key card.

Classification code check

The classification code in the card data is checked as to whether it represents the expected type of key card. The types of key cards for opening the lock unit 70 are predetermined as already stated, and the classification codes of these types are stored in the memory or incorporated in the program. Unless the classification code represents the expected type, the card is judged as being invalid. This check is conducted also for every type of key card.

Sequence number check

The sequence number in the card data is checked with the sequence number in the lock unit memory for matching. The former number is also checked as to whether it is in a given relation which is determined by the sequence number in the lock unit and the sequence sub-number in the card data. When a match is found or when it is in the given relation, the card is found acceptable. If otherwise, the card is judged as being invalid. The sequence number in the memory used is of course the number of the key card of the type concerned.

When the sequence number is found to be in the given relation, it is stored as the latest sequence number in the location concerned within the memory sequence number area (renewal of sequence number).

If the corresponding sequence number is not present in the pertinent area of the lock unit memory, the card is not judged as being invalid by the sequence number check but is found acceptable. The sequence number in the card data is then stored in the area concerned. No sequence number will be present in the memory when a key card is used for the first time after the lock unit 70 is installed, or when sequence numbers are cleared by the foregoing clearing mode process with the data input unit 50, or when the sequence number is cleared by a cancelling card.

This check is conducted also for every type of key card.

Dead bolt check

Whether the dead bolt 71 is in advanced position is checked with reference to the detection signal of the dead bolt sensor 87. When the dead bolt 71 is in its advanced position, an unlocking process will not be executed unless emergency card or guest card B is used.

Lockout check

When a process with lockout card is executed normally in the card lock unit 70, the lockout flag in the memory is set to 1. The lockout flag is reset to 0 only by a normal process with cancelling card.

The lockout flag is checked as to whether it is set to 1. If the flag is 1, an unlocking process will not follow unless emergency card is used.

Since the lockout card and cancelling card are not intended for opening the lock unit, these key cards are not checked for lockout.

Time zone check

This check is conducted only for the maid card. The maid card data includes time zone data. If the current time (clock data in the initial data area of the lock unit memory) is within the time zone, the card is acceptable. If otherwise, unlocking process will not follow.

Room range check

This check is conducted also for the maid card only. When the room number stored in the lock unit memory is between the starting room number and the ending room number included in the data on the maid card, the card is acceptable. If otherwise, unlocking process will not follow.

Room number matching check

This check is performed for guest cards (A and B), maintenance card and standby card. When the room number in the card data matches the room number in the lock unit memory, the card is acceptable. If otherwise, unlocking process is not performed.

Stay period check

This check is specific to the guest cards A and B. The guest card data includes date of issue of the card (check-in date) and check-out time. When the present time minus the allowable check-out overtime is between the day of check-in and the check-out day, time, the card is acceptable. If otherwise, the card is judged as being invalid.

Checks specific to maintenance card

The checks specific to the maintenance card are an effective period check and first use check.

The maintenance card is usable only once on the day of issue. The check as to whether the day it is used matches the day of issue of the card is the effective period check. The day of issue in the card data is compared with the present date, and if they match, the card is acceptable. If otherwise, the card is invalid.

When the maintenance card has been used once, the flag indicating the use of card in the lock unit memory is set to 1. The first use check determines whether this flag is 1 when the card was used. If the flag is reset to 0, the card is acceptable, whereas if it is 1, the door is no longer unlockable on that day with use of the card. The flag is automatically reset, for example, at 0:00 by MPU.

FIG. 32 shows an unlocking process, including the above key card validity checks, which is performed by the MPU of the card lock unit 70. Although the validity checks are performed in a predetermined order according to this flow chart, these checks can of course be conducted in a desired order.

The unlocking process will be described in the order shown in FIG. 32.

(2) Checks Common to All Types of Cards

When a key card is passed through the card groove 74 for scanning, the card data is read from the card by the reader 82 (step 311). The card is first subjected to the parity check (step 312). When found thereby acceptable, the card data is interpreted (step 313), followed by the format check and then by the hotel code check (steps 314 and 315). When found acceptable by these checks, the data is further checked for classification code (steps 321, 331, 341, 351, 361, 371, 381 and 391). Thus the type of card is identified, and the card is processed according to the type.

(3) Display of Invalidity of Card

If the card is found invalid by one of the parity check, format check, hotel code check and classification code check, the red pilot lamp 77 goes on for 1 second, and the process is completed without unlocking (steps 421 to 423).

(4) Emergency card

When the card is found to be an emergency card by the classification code check (step 321), sequence number check only is conducted (steps 322, 323). For sequence number checking, step 322 checks whether the sequence number in the card data matches that in the memory and whether the two sequence numbers are in he definite relation (this by calculation). The sequence number process for other key cards is conducted similarly (steps 332, 344, 354, 364, 372, 382, 393). When the card is found acceptable, the routine of unlocking and battery check is executed. If otherwise, the above key card invalidity display routine is performed.

(5) Unlocking and Battery Check

In this routine, the solenoid 85 is first energized and brought to the unlocking position. The detection signal of the solenoid sensor 86 confirms that the solenoid 85 has been brought to the unlocking position (steps 401, 402). This check can be accomplished by detecting the change of the output of the solenoid sensor 86 from ON (at one stationary position) to OFF (during movement) and then to ON (at the other stationary position). The unlocking duration measurement is started (step 403).

The battery is checked only when master, maid or maintenance card is used. If the card is such a specific card (step 404), the battery check circuit 89 functions to check whether the output voltage of the battery 88 is up to the predetermined level as already stated (step 410). If it is at this level or lower, the green pilot lamp 76 flickers, indicating the need of replacement of the battery 88 (step 411). If the battery output voltage is at the normal level, the green pilot lamp 76 goes on (step 405).

Also when the card is other than the specific cards, the green pilot lamp 76 goes on, showing the lock unit is open (step 405). The green pilot lamp 76 is held on or on-and-off until the unlocking duration elapses.

Upon the lapse of unlocking duration (step 406), a reverse current flows through the solenoid 85 to return the solenoid 85 to the locking position again (step 407). The return of the solenoid 85 to the locking position is detected (step 408), whereupon the lighting or flicker of the lamp 76 is discontinued (step 409), whereby the unlocking process is completed.

(6) Master Card

When the card is found to be a master card by the classification code check (step 331), sequence number check (steps 332, 333), dead bolt check (step 334) and lockout check (step 335) are performed. When the card is found acceptable by the sequence number check, the dead bolt 71 is in its retracted position and the state is not lockout (lockout flag =0), the above routine of unlocking and battery check is conducted. If the card fails to pass one of the above check, a key card invalidity display routine follows.

(7) Maid Card

Conducted for the maid card (step 341) are a time zone check (step 342), room number range check (step 343), sequence number check (step 344 and step 345), dead bolt check (step 334) and lockout check (step 335). When the card is found acceptable by all of these checks, unlocking and battery check follow, whereas key card invalidity is on display when the card proves unacceptable by any one of the checks.

(8) Guest Card

In the case where the card is a guest card (step 351), a room number check (step 352), stay period check (step 353) and sequence number check (steps 354, 355) are conducted. When the card passes all of these checks, the card is discriminated (A or B, step 356). When it is guest card A, dead bolt check (step 334) and lockout check (step 335) are further performed. When it is guest card B, lockout check only further follows without the dead bolt check.

When the results of all these checks are acceptable, an unlocking routine is performed (without the battery check). If even one of the check results is unacceptable, the routine of key card invalidity display is performed.

(9) Maintenance Card

When the card is a maintenance card (step 361), the checks conducted are room number check (step 362), effective period check (step 363), sequence number check (steps 364, 365), first use check (step 366), dead bolt check (step 334) and lockout check (step 335). When the results of all the checks are acceptable, the flag indicating the use of the maintenance card is set to 1 (not shown), followed by unlocking and battery check. If one of the check results is not acceptable, judgement of invalidity is made.

(10) Lockout Card

When the classification check reveals that the card is a lockout card (step 371), the sequence number only is checked (steps 372 and 373). When the card passes this check, the lockout flag is set to 1 (step 374), bringing the lock unit 70 into lockout state. To notify this state, the green pilot lamp 76 goes on for 1 second only (steps 375 to 377), whereby the lockout process is completed without unlocking. When the card fails to pass the sequence number check, the routine of key card invalidity display follows.

(11) Cancelling Card

The cancelling card has the foregoing two functions. One is to release the lock unit 70 from the lockout state, and the other is to clear the sequence numbers of guest card and maintenance card which are stored in the lock unit memory.

When the card is found to be a cancelling card (step 381), the sequence number only is checked (steps 382 and 383). When the card passes the check, the lockout flag is checked as to whether it is set to 1 or reset to 0 (step 384).

If the lockout flag is 1, the flag is reset to 0 to bring the unit out of the lockout state (step 386). Further if it is not in the lockout state, the sequence numbers of the guest card and maintenance card are cleared from the pertinent area of the memory (step 385).

In either case, the green lamp 76 goes on for 1 second to indicate that the specified process has been completed (steps 375 to 377). The process with the cancelling card is not accompanied by the unlocking routine, either.

To distinguish the lockout cancelling process from the sequence number clearing process as to the completion thereof, different pilot lamp displays may be used therefor. For example, the green or red lamp 76 or 77 may be flickered to indicate the completion of the former process. Alternatively a pilot lamp of yellow or other color may be turned on.

When the card fails to pass the sequence number check, the routine of key-card invalidity display is performed.

(12) Standby Card

In the case of standby card (step 391), the checks conducted are room number check (step 392), sequence number check (steps 393, 394), dead bolt check (step 334) and lockout check (step 335). When the card passes all of these checks, an unlocking routine follows (without battery check). If the card fails to pass one of the checks, key card invalidity routine is performed.

22. Features and Modifications of Embodiment (1) Secrecy of Hotel Code

The hotel code is keyed in the console 10 by the responsible person of the maker or installing company. The code is encoded in authorization cards AC and key cards KC when these cards are to be issued. It is further entered in the card lock unit 70 provided for each hotel room through the data input unit 50. Once entered in the console 10, the hotel code is transferred to cards and lock units 70 in an invisible state, so that none of the persons at the hotel inclusive of the responsible person recognize the code.

Furthermore, the input of the hotel code into the console 10 is possible only with the issue of GR card which is handed to the hotel personnel, so that the responsible person of the maker or installing company can no longer change the hotel code.

Thus, the hotel code retains high secrecy.

(2) Security of GR Card

GR card is issued by the responsible person of the maker or installing company only with the input of hotel code into the console. Moreover, it is only after the hotel responsible person has entered a GR secret code into the console that the GR card is usable for issuing the other authorization cards (MA, SMA and GA cards).

Stated conversely, the maker or installing company can issue the GR card but is unable to know the GR secret code and is therefore unable to issue the other authorization cards. On the other hand, the hotel personnel is unable to issue any GR card. Accordingly when the GR card is so limited that only one GR card is available to one hotel, the GR card retains high security. This serves to prevent unauthorized issue of other authorization cards and key cards.

(3) Security of MA, SMA and GA Cards

The authorization cards which are usable for issuing key cards are MA, SMA and GA cards. These authorization cards must therefore retain high security. Security of these cards is maintained in the following manner.

First, MA, SMA and GA cards are issued only with use of GR card which retains high security as mentioned above and which is carried only by the hotel responsible person. Consequently these cards will not be issued in an unauthorized manner.

Second, the staff code, etc. of the issued MA, SMA and GA cards are registered in the issued AC registration area of the console RAM. Such cards are invalidated with use of GR card. The invalidated card is no longer usable for issuring key cards. This prevents wrongful use of MA, SMA and GA cards that would otherwise result when the card is lost or staff members retired.

(4) Security of Key Card Issue

MA, SMA and GA cards which are indispensable to the issure of key cards retain high security as mentioned above. Moreover, when a key card is to be issued with use of the authorization card, the staff secret code is checked, and the authorization card used is checked as to whether it is one registered in the issued AC registration area of the RAM. This serves to check the card issuing staff member for authorization and to check the authorization card for validity.

Thus, the key cards can be issued only under stringent control and are therefore given a high level of security.

Furthermore, the key cards other than the guest card and maid card can be issued only with use of MA card, and the maid card only by using MA and SMA cards, so that the staff members who can issue these key cards are limited.

Additionally, when a key card is issued, a key card issue record is printed out, showing the type of the key card, the type of authorization card used, the issuing person (staff code) and the time of issue. A trouble, even if occurred, can therefore be handled satisfactorily.

The embodiment is so adapted that the key card issue record is printed out upon the issue of a key card. However, key card issue record may be stored in the RAM so as to print out such items of data at specified time interval or every day or only with use of a specific authorization card.

(5) Card Issuing System

From the viewpoint of security, the cards can be divided into three types. The first type, which is highest in security level, is GR card, whereby the cards of second type, i.e. MA, SMA and GA cards, are issued. Key cards, which are of third type, are issued with use of cards of the second type.

GR card of the first type is issued by the card issuing console on condition that the maker side secret code in the console RAM matches the keyed-in secret code. Thus, the hotel code is recorded in incomplete GR card, whereby the GR card is completed. This associates the completed GR card with the console which issued the card.

Next, GR secret code is entered with use of GR card and stored in the console RAM, whereby the GR card is associated with the bearer and with the console.

MA, SMA and GA cards of the second type are issued with use of GR card and on condition that the GR secret code keyed in matches the GR secret code in the console. In other words, the card of the second type is issued on condition that the card of the first type, the bearer of the card and the console are associated. Moreover, the card data of the second type is registered in the console, while the registered data can be deleted by using GR card of the first type, with the result that the card of the second type is closely related to the first-type card, the bearer thereof and the console.

When the card of the second type is to be issued, the staff secret code is registered and recorded on the card, so that the staff member carrying the second-type card is also closely related to the second-type card and the console.

The key card of the third type is issued using a card of the second type and on condition that the second card is registered in the console and that the keyed-in staff secret code matches with the staff secret code in the card or the console. In other words, the third-type card is issued on condition that the second-type card, the bearer thereof and the console are associated.

In this way, a plurality of types of cards having a kind of hierarchical structure are issued successively in the order of descending level, each with use of a card of higher level, on condition that the card of higher level, issuing person and card issuing machine are associated.

Although the maker side secret code is not recorded in GR card according to the embodiment, the code may be so recorded by the maker.

(6) Card Issuing Console Having Two Card Readers

The card issuing console has a first card reader for reading the card data from an authorization card, and a second card reader having a card reading-writing function for issuing cards. The authorization card is inserted into the first reader, and the card data is read and checked (secret code check and check as to whether the card is a registered valid card). When the card is found acceptable, a card can be issued by the second card reader. The first card reader and the check of the authorization card inserted therein serve as a "key" for giving the console a permission to issue the card.

Generally the key for permitting the operation of machines is mechanical. When the key is lot, the portion of the machine concerned needs replacement. Moreover, irrespecitve of authorization to manipulate the key, one carrying the key can operate the machine.

With the card issuing console having the above two card readers, the authorization card, even if lost (in the case of MA, SAM or GA card), can be reissued using GR card, so that there is no need to repair the console. Further if the registration of the lost authorization card is eliminated, it become impossible to use the card, hence high security. Moreover, one issuing the card can be checked for authorization by the secret code check. This eliminates the likelihood that any one can issue cards.

(7) Usefulness of Card Issuing Console and Authorization

Cards in Hotel System

The card issuing console is very useful for the card lock system of hotels. MA, SMA or GA cards are issued to a plurality of specified hotel staff members according to the position of the member. The guest card for the quest to use the room assigned to him can be issued using any of these authorization cards. The main routine at the hotel is handling of check-in and check-out for the guest, and a guest card must invariably be issued for check-in. Since the guest card can be issued with use of any authorization card (other than GR card), at least one staff member bearing such an authorization card needs only to be present at the front. This permits staff members to leave the work position or to be be replaced by another one with greater ease.

The maid card, emergency card, master card, etc. need not be issued as routine practice. It may be arranged that only a staff member having a specific authorization card (e.g. MA or SAM card) can issue special cards other than the guest card. This will not entail any particular trouble but is rather favorable in assuring high security because the specified person only can issue special cards.

(8) Two Types of Guest Cards

There are two types of guest cards which can be issued, i.e. A and B. The guest card A is unable to open the card lock unit 70 when it is fastened by the dead bolt 71. The guest card B is usable for unlocking irrespective of whether the dead bolt 71 is in the locking position.

Which type of guest card, A or B, is to be issued is determined by the operation mode of the console. Accordingly, when the hotel card lock system is to be installed, which type of guest card is to issue can be determined according to the request of the hotel.

Instead of determining the type of guest card according to the operation mode setting, the card type may be determined every time a guest card is to be issued. In this case, the staff member keys in an input to select A or B when issuing the guest card, and the classification code to be encoded in the guest card is determined according to the result of keying in. In this way, the guest's request can be met in issuing his guest card.

(9) Issue of a Plurality of Identical Guest Cards

While one person lodges in a single-type room as a rule, at least two persons will lodge in a twin-type or triple-type room. When one room is used by two or more guests, the guests are likely to feel inconvenience if a single guest card is issued for one room.

With the card issuing console of the present embodiment, a desired number of guest cards can be issued for one room, so that a guest card can be handed to each of a plurality of guests who share one room. Each person can therefore open the lock unit.

Moreover, when issuing guest cards for one room, the staff member needs to key in only once the data required for issue (room number, check-out time, number of cards), whereby the specified number of guest cards can be issued (see FIG. 15). The key input procedure is therefore simple.

(10) Reissue of Guest Card

Even after a guest card has been issued, there arises a need to reissue another guest card for the same room if the length of stay is to be changed or the first card was lost. It is not desirable to readily permit the reissue of guest card, because guest cards unlimitedly issued are likely to be used wrongfully to reduce the security of the card lock system.

For the reissue of guest card, a procedure different from the usual issue procedure must be followed so that the staff member in charge will take full care. When issuing a guest card, "GUEST" switch among the function switches 15 is merely depressed to start a card issuing process (FIG. 14, steps 184, 194), whereas in the case of reissue, it is necessary to depress "CANCEL (ROOM)" function switch (FIG. 14, steps 185, 195) and to further select one item from among room cancell, check-out change and card reissue according to the indication on the display 12 (FIG. 16, steps 201 to 204).

These items are classified as follows and are different in procedure and conditions.

Room cancel

The guest card issued is cancelled before it is used on the card lock unit 70. This can be accomplished using key input or guest card.

Check-out change

A change of stay period within the period of stay after the guest card issued has been used at least once on the card lock unit 70. This can be handled only with use of the guest card in use.

Card reissue

Reissue of guest card within the period of stay after the issued guest card has been used at least once on the card lock unit 70. This is the procedure to be followed when the guest card was lost. The new card reissued needs to be immediately used on the corresponding card lock unit.

(11) Use of Paper Cards

Paper cards are used as guest cards (A and B), maintenance card and standby card. Use of paper cards for these key cards which are issued in large quantities leads to a cost reduction and is economical.

Because room number and like card data can be printed on the surface of the paper card, the purpose of the card can be visually recognized to some extent without resorting to the card data monitoring process (FIG. 14, step 197).

Although the guest card and maintenance card only are printed on according to the embodiment, room number, etc. may be printed also on the standby card. The items of card data to be printed on such key cards can be determined as desired.

(12) Re-Registration of Card Data

The data to be registered in the issued AC registration area and sequence number area of the RAM of the parent console 10 can be read from the card data and written in these areas. When the RAM data disappeared for some cause, this can be a remedy.

(13) Initial Data Input/Output with Data Input Unit

The main function of the data input unit 50 is to receive from the parent console 10 the initial data (hotel code, clock data, unlocking duration and allowable check-out overtime) which is common to the operation of all card lock units 70, and to write the initial data in each card lock unit 70 along with the room number (which is keyed in) of the room equipped with the unit 70 (initial data setting mode).

The card lock unit 70 operates in off-line mode (that is, the unit is not connected to the console by a transmission line). However, since the initial data, etc. are given by the data input unit 50, the unit 70 executes unlocking and other process with use of a key card.

The memory of the data input unit 50 further has an initial data set room number registration area, in which the room numbers of rooms for which the initial data setting has been completed are registered. When the unit 50 is connected to the console 10, these room numbers are printed out at the console 10. Accordingly the room numbers can be visually recognized and retained as a record.

The data input unit 50 may be usable for writing in card lock units 70 the sequence numbers of various key cards registered in the sequence number area of the RAM in the console 10 and the sequence numbers of room maintenance cards stored in the room data area.

(14) Other Functions of Data Input Unit

The data input unit has, in addition to the above initial data input/output function, the function of reading data from the memory of the lock unit 70 and showing the data on the display 51 (reading mode), the function of writing specified data in the memory of the lock unit 70 (writing mode) and the function of clearing the desired sequence number within the lock unit 70 (clearing mode). With these functions, the lock unit 70 can be maintained and inspected, and the data therein can be modified as required.

(15) Sequence Number Cancellation in Card Lock Unit

The memory of the card lock unit 70 has stored therein the latest sequence number of each key card to be used. When a newly issued key card is used, the sequence number of the card is checked as to whether it is in a predetermined relation with the sequence number in the lock unit 70. If the relation is found, unlocking and other processes are executed, and the sequence number of the key card is registered in the memory of the lock unit to renew the stored sequence number.

For example, suppose a key card of one type was lost, another key card of the same type is issued with a new sequence number and then is also lost before use, and another key card with a further new sequence number is issued. Thus, if two or more key cards, each with a renewed sequence number, are used successively with the sequence number in the lock unit memory remaining unchanged, it is likely that the lock unit 70 will be no longer able to check whether the key card sequence number is in the predetermined relation with the stored sequence number.

To overcome the disturbance of sequence number resulting from such loss of card or an error in use, the corresponding key card sequence number in the lock unit memory is cleared. The sequence number of the new key card is then accepted by the unit 70 and registered in its memory. If a new key card is subsequently issued, the sequence number in the unit 70 will be renewed accordingly.

The sequence number can be cleared from the lock unit memory using the data input unit 50 and a cancelling card. When the unit 50 is used, the sequence number of desired key card can be cleared (clearing mode). Further if the cancelling card is used, the sequence numbers on the guest card and maintenance card are cleared.

The cancelling card may be adapted to clear the sequence number of other key card. Different cancelling cards may be issued for different types of key cards for clearing the sequence number.

(16) Lockout of Room and Unlocking

There arises a need for the hotel to lock out a specified room so as not to permit any person to use it. In such a case, a lockout card is used. When a lockout flag is set by the lockout card in the lock unit 70, the unit can no longer be opened by any type of key card except the emergency card.

Lockout is cancelled by the cancelling card.

It is also possible to set and/or cancel lockout with use of the data input unit.

(17) Two Functions of Cancelling Card

As stated above, the cancelling card has two functions: one is to clear a specified sequence number in the lock unit 70, and the other is to cancel lockout.

When the cancelling card is used on the lock unit 70, the lockout flag is checked, and if the unit is locked out, the flag is reset to cancel the lockout. Unless the lockout flag is set, the sequence number of guest card as well as of the maintenance card is cleared.

When the cancelling card is used twice successively while the lock unit 70 is in locked-out state, the lockout is cancelled by the first use, and the sequence number is cleared the next time.

Thus, the cancelling card has two functions in combination. This serves to simplify the card lock system.

(18) Battery Check for Card Lock Unit

The lock unit 70 is operated by the power supplied by the battery 88 incorporated therein. The degree of depletion of the battery, which is not visually observable directly, needs to be checked and displayed by an electric circuit. However, if the battery is checked for depletion and the result shown at all times, this will promote depletion. According to the present embodiment, the battery check circuit 89 functions only when master, maid and maintenance cards are used, and the check result is displayed by the green pilot lamp 76. This assures that the battery check will be done periodically and when required This is also appropriate in view of the significance of battery check and further from the viewpoint of prevention of depletion of the battery. The master card is carried by a specified staff member and is used for unlocking only for a special purpose, so that it is desirable for the specific staff member to check the state of the battery 88 on such an occasion. Further because the maid cleans the room periodically (e.g. once daily), it is desirable for the maid to check the state of the battery when opening the lock unit 70 with her maid card. This assures periodical check of the battery. It is also appropriate for the maintenance man to check the battery when required or periodically.

On the other hand, key cards, such as guest cards, which are used frequently, or cards such as emergency cards which are used in emergency are not used for battery check. This prevents undesirable depletion of the battery. With unnecessary display thus elimianted, a useless disturbance is avoidable.

(19) Dead Bolt and Key Cards

A lock unit which is easily unlockable with a key card although fastened by the dead bolt disturbs guest's privacy and is undesirable. Nevertheless, it is required to ensure unlocking in an emergency even if the door is locked by the dead bolt. The present embodiment fulfils these conflicting requirements in the following manner.

As already mentioned, two types of guest cards are available: guest card A which is unable to unlock the door locked by the dead bolt, and guest card B which assures unlocking even in such a case. These cards are provided to meet the needs of guests. As already mentioned, it is preferable that one of the two be selectable every time a guest card is to be issued.

The emergency card is prepared for use in an emergency. Even if fastened by the dead bolt, the card lock unit can be opened only when this card is used. This eliminates the likelihood that one will wrongfully enter the room with a usual key card or master card although the door is locked by the dead bolt, consequently giving enhanced security. In the event of emergency, however, the lock unit is quickly openable with use of the emergency card irrespective of whether it is fastend by the dead bolt. The use of the emergency card is limited to emergencies to assure increased security.

Preferably the master card may be modified to have the following function. When the master card is used for a card lock unit, the MPU of the unit checks whether the room is occupied by the guest. The memory of the lock unit has a card read data area, in which the card data on the guest card is stored. The check-in date and check-out day and time included in the card data readily indicate whether the room is still occupied. During the period of stay, the master card is prohibited from unlocking the room which is locked by the dead bolt, such that only during the vacant period, the master card is allowed to unlock the door even if it is locked by the dead bolt. The master card thus modified secures privacy of the guest and yet has greater freedom in that it serves the same function as the emergency card in a specific case.

(20) Emergency Card

The emergency card is used for unlocking rooms in an emergency. The card lock unit can be opened by this card even if the room is locked out or locked by the dead bolt. Such a special key card is provided to satisfactorily meet the special situation of emergency.

(21) Master Card

The card, which corresponds to a so-called master key, is unable to unlock a room which is locked out or locked by the dead bolt. This secures privacy and gives increased security to the room.

As mentioned above, the master card may be so modified that during the period other than the guest's stay period, the room, even if locked by the dead bolt, can be thereby unlocked. Further the master card may be adapted to have the function of cancelling lock-out.

(22) Maid Card

The maid card, which is checked for time zone and room number range, is usable for unlocking specified rooms alone for a specified period of time only. Thus, the card is adapted to give enhanced security to the hotel card lock system. Furthermore, the maid card which is unable to unlock the rooms locked by the dead bolt secures the guest's privacy. Locked-out rooms are not unlockable also by this key card.

(23) Maintenance Card

The maintenance card is usable for unlocking one specified room only once and only on the day of issue of the card. The unlocking function thus greatly limited gives increased security to the hotel card lock system.

The maintenance card may be made usable any number of times without the first use check insofar as it is used on the day of issue of the card.

(24) Standby Card

When malfunctioning, the card issuing console is unable to issue key cards, in particular, guest cards, causing troubles to the hotel business. The sequence number of the guest card issued is renewed under a predetermined rule, and the latest sequence number is stored only in the console, so that some other backup machine is not serviceable as a substitute for issuing guest cards.

To meet such a situation, standby cards are issued in advance and preserved for each room. In the event of a malfunction of the console, a standby card for the room concerned is handed to the guest in place of the guest card. The standby card, which has a sequence number totally irrelevant to the sequence number of the guest card, is usable free of the influence of the malfunction of the card issuing console.

What is claimed is:

1. A method of issuing cards by using a card issuing machine having a memory with an initial secret code stored therein, a card reader and a keyboard, the method comprising the steps of:

(A) checking whether a secret code keyed in on the keyboard matches the initial secret code stored in the memory;

(B) when the above two secret codes are found to match, (i) storing a specified secret code into memory, the specified secret code being keyed in and associated a first card with the card issuing machine, (ii) recording the associating specified secret keyed-in code in the first card by the card reader, and (iii) issuing the first card;

(C) confirming a keyed-in first secret code of the first card issued and issuing at least one second-type card; and (D) confirming a second secret code of one of said at least one second-type card issued, and issuing at least one third-type card.

2. A card issuing system, comprising:

a card reader for reading card data from the first card, a keyboard for entering a secret code of the first card and data needed for issuing a second card, means for comparing a keyed-in secret code with the secret code in the card data read from the first card by the card reader or with a secret code stored in a memory and accessible by the card data in the first card, a card writer for issuing the second card by writing specified card data including the keyed-in data in the second card when the keyed-in secret code matches with the secret code in the card data read from the first card by the card reader or with the secret code stored in the memory and accessed by the card data in the first card.

3. A card issuing system as defined in claim 2 further comprising:

memory having stored therein data specific to the first card for specifying the first card, means for checking data specific to the first card and read by the card reader with the data specific to the first card and stored in the memory, and the controlling means for permitting issue of the second card when the two secret codes match and also when the two items of data specific to the first card match.

4. A key card issuing system comprising:

a card reader for reading card data from an authorization card, means for determining issue of a key card by checking the card data read from the authorization card by the card reader, a card writer for writing specified data in the key card and issuing the key card when the key card is allowed to be issued, and means for recording data specific to the authorization card used for issuing each key card and data relating to the issued key card.

5. A key card issuing system as defined in claim 4 wherein the recording means is a printer.

6. A key card issuing system as defined in claim 4 wherein the recording means is a memory.

7. A key card issuing system as defined in claim 4 wherein the recording means comprises a memory for temporarily storing data relating to the issue of the key card and a printer for printing out the data read out from the memory.

8. A data input device in a card lock system for transferring data between a key card issuing unit and a card lock unit, the data input device comprising:

a connector for connecting the data input device to the card issuing unit and to the card lock unit, means for setting input and output modes, means for entering a number specific to the card lock unit, means for receiving specified data from the key card issuing unit and storing the data when the input mode is set, and means for transferring the specified data and the entered number specific to the card lock unit to the card lock unit when the output mode is set.

9. A data input device as defined in claim 8 which further comprises means for storing data relating to completion of the transfer of the specified data and the specific number to the card lock unit.

10. A data input device as defined in claim 9 which further comprises means for feeding the data stored in the storing means to the card issuing unit.

11. A card issuing system as defined in claim 2 further comprising:

a card reader for reading data specific to the issued second card for specifying the second card, a memory having stored therein data relating to the second card issued including the data specific to the second card, and re-registration control means for writing the read data specific to the second card into the memory, when the data relating to the second card has disappeared from the memory.

12. A card issuing system as defined in claim 3 further comprising:

a card reader for reading data specific to the first card for specifying the first card, re-registration control means for writing the read data specific to the first card into the memory, when the data relating to the first card has disappeared from the memory.

13. A key card issuing system as defined in claim 4 further comprising:

a card reader for reading data specific to the authorization card for specifying the authorization card, a memory having stored therein data specific to the authorization card, and re-registration control means for writing the read data specific to the authorization card into the memory, when the data relating to the authorization card has disappeared from the memory.

14. A key card issuing system as defined in claim 4 further comprising:

a card reader for reading data specific to the issued key card for specifying the key card card, a memory having stored therein data specific to the key card issued, and re-registration control means for writing the read data specific to the key card into the memory, when the data relating to the key card has disappeared from the memory.

15. A key card issuing system as defined in claim 4 which further comprises means for entering a number of key cards to be issued and means for controlling the card writer so that the number of key cards designated by the entering means are issued.

16. A key card issuing system as defined in claim 4 further comprising means for entering an instruction for reissuing the key card.

17. A data input device as defined in claim 8 further comprising:

means for setting reading mode, and means for reading data from the memory of the card lock unit and showing the data read on the display, when the reading mode is set.

18. A data input device as defined in claim 8 further comprising:

means for setting writing mode, and means for writing specified data in the memory of the card lock unit when the writing mode is set.

19. A data input device as defined in claim 8 further comprising:

means for setting clearing mode, and means for clearing designated data in the memory of the card lock unit when the clearing mode is set.

20. A card lock device, comprising:

a latch bolt, a first driving means for electrically moving the latch bolt between its locking position and unlocking position, a dead bolt which is manually movable between its locking position and unlocking position, a second driving means for electrically bringing the dead bolt from the locking position to the unlocking position, a card reader for reading card data from a key card, and unlocking control means for causing the first and second driving means to bring the latch bolt and dead bolt to their unlocking positions, when the card data read by the card reader includes a specified code indicating unlocking of the dead bolt.

21. A card lock device as defined in claim 20 wherein a solenoid is provided for serving commonly as the first and second driving means.

22. A card lock device as defined in claim 20, further comprising a sensor for detecting the dead bolt as located in one of the locking and unlocking positions, and wherein when an output signal of the sensor shows that the dead bolt is in the locking position, said unlocking control means causes the first and second driving means to bring the latch bolt and dead bolt to the unlocking positions if the card data includes the specified code and, when the output signal of the sensor shows that the dead bolt is in the unlocking position, said unlocking control means causes the first driving means to bring the latch bolt to the unlocking position regardless of whether the card data includes the specified code.

23. A system for issuing a key card used in a card lock device having a dead bolt manually movable between its locking position and unlocking position and drive for electrically bringing the dead bolt at the locking position to the unlocking position, the key card issuing system comprising:

a card reader for reading card data from an authorization card, means for determining issue of a specified key card by checking the card data read from the authorization card by the card reader, means for setting a specified mode for issuing a specified key card usable for unlocking the card lock device in which the dead bolt is in the locking position, and a card writer, when the key card is allowed to be issued, for writing in a key card specified data including a code for causing the drive means in the card lock device to bring the dead bolt at the locking position to the unlocking position and for issuing the specified key card, if the specified mode is set.

24. A card lock unit for use with key cards each having recorded therein at least a sequence number, the unit comprising:

a card reader for reading the data recorded in the key card, a memory for storing a sequence number, means for electrically unlocking the card lock unit locked by a dead bolt manually lockable, unlocking control means, only when the data read from the key card by the card reader shows a specified code, for comparing the sequence number in the key card with the sequence number in the memory to give an unlocking instruction to the unlocking means if the sequence number in the key card and the sequence number in the memory are in a given relation.

25. A system for issuing a key card made of paper and having an electrically or magnetically data recording area, comprising:

a card reader for reading card data from an authorization card, means for determining issue of the key card by checking the card data read from the authorization card by the card reader, a card writer for writing specified data in the recording area of the key card, a printer for printing given data on the key card, and a control means for causing the card writer and printer to operate to issue the key card when the key card is allowed to be issued.

26. A card lock unit for use with key cards each having recorded therein a sequence number, the unit comprising:

a card reader for reading the data recorded in the key card, a memory for storing a sequence number, electric unlocking means, first control means for comparing the sequence number in the key card with the sequence number in the memory to give an unlocking instruction to the electric unlocking means when a match is found between the two sequence numbers, second control means for checking whether or not the sequence number in the key card and the sequence number in the memory are in a predetermined relation to give an unlocking instruction to the electric unlocking means and to store the sequence number of the memory when the sequence number in the key card and the sequence number in the memory are in the predetermined relation, and means for clearing the sequence number in the memory.

27. A card lock unit as defined in claim 26 further comprising:

third control means for giving an unlocking instruction to the electric unlocking means for storing the sequence number of the key card in the memory when no corresponding sequence number is stored in the memory.

28. A card lock system as defined in claim 26 wherein the clearing means is a data input device for transferring data between a key card issuing unit and the card lock unit.

29. A card lock unit as defined in claim 26 wherein in the clearing means clears the sequence number in the memory when the data read from the card by the card reader indicates that the card used is a specified card for clearing.

30. A card lock unit as defined in claim 26 which further comprises means for setting/resetting a lockout state, wherein the first control means gives the unlocking instruction to the electric unlocking means and the second control means gives the unlocking instruction and stores the sequence number for the renewal thereof only when the lockout state is reset, wherein lockout state setting/resetting means resets the lockout state when the lockout state has been set and the data read from the card by the card reader indicates that the card used is a specified card for cancelling, and wherein the clearing means clears the sequence number in the memory when the lockout state has been reset and the data read from the card indicates that the card used is the specified card for cancelling.

31. A card lock unit for use with key cards each having recorded therein at least a sequence number, the comprising:

a card reader for reading the data recorded in the key card, a memory for storing a sequence number, means for setting and resetting a lockout state, electric unlocking means, and unlocking control means, when the lockout state is reset, for comparing the sequence number in the key card with the sequence number in the memory to give an unlocking instruction to the electric unlocking means if the sequence number in the key card and the sequence number in the memory are in the given relation.

32. A card lock system as defined in claim 31 wherein the lockout state setting and resetting means is a data input device for transferring data between a key card issuing unit and the card lock unit.

33. A card lock unit as defined in claim 31 wherein the lockout state setting and resetting means set the lockout state when the data read from the card by the card reader indicates that the card used in a specified card for lockout and reset the lockout state when the card data indicates that the card is a specified card for cancelling the lockout.

34. A card lock unit for use with key cards each having recorded therein a sequence number, the unit comprising:

a card reader for reading the data recorded in the key card, electric unlocking means, unlocking control means for comparing the sequence number in the key card with the sequence number in the memory to give an unlocking instruction to the electric unlocking means when the sequence number in the key card and the sequence number in the memory are in a given relation, means for checking the degree of depletion of a battery for supplying the card lock unit with electric power to display the result of the battery check, and battery check control means for causing the battery check means to function only when the data read from the key card by the card reader shows that the card used is a specified key card.

35. A card lock unit for use with key card each having recorded therein a sequence number, time zone and room number range, the unit comprising:

a card reader for reading the data recorded in the key card, a memory for storing a sequence number and room number, a clock, electric unlocking means, first check means for checking whether or not the sequence number in the key card and the sequence number in the memory are in a given relation, second check means for checking whether or not the current time indicated by the clock is within the time zone in the key card, third check means for checking whether or not the room number stored in the memory is within the room number range in the key card, and unlocking control means for giving an unlocking instruction to the electric unlocking means when the results of the first, second and third check show the validity of the key card.

36. A card lock unit for use with key card each having recorded therein a sequence number and day of issue, the unit comprising:

a card reader for reading the data recording in the key card, a memory for storing a sequence number and data indicating the use of the key card, a clock, electrical unlocking means, first check means for checking whether or not the sequence number in the key card and the sequence number in the memory are in a given relation, second check means for checking whether or not the day indicated by the clock matches with the day of issue in the key card, third check means for checking whether or not the key card has been used once with reference to the data indirecting the use of the key card, and unlocking control means for giving an unlocking instruction to the electric unlocking means when the results of the first, second and third check show the validity of the key card.

37. A card lock unit for use with at least guest cards and a standby card each having recorded therein a sequence number, the unit comprising:

a card reader for reading the data recorded in the card, a memory for storing a guest sequence number and standby sequence number, electric unlocking means, unlocking control means for comparing the sequence number in the card with the sequence numbers in the memory to give an unlocking instruction to the electric unlocking means when the sequence number in the card and one of sequence numbers in the memory are in the given relation.

38. A card issuing method as defined in claim 1, wherein the confirmation of the secret code is executed by collating a keyed-in secret code with a secret code recorded on the card or stored in the card issuing machine.

* * * * *